(12) United States Patent
Liszewski et al.

(10) Patent No.: US 12,533,167 B2
(45) Date of Patent: Jan. 27, 2026

(54) INTEROSSEOUS COUPLER

(71) Applicant: New York Society for the Relief of the Ruptured and Crippled, Maintaining the Hospital for Special Surgery, New York, NY (US)

(72) Inventors: Andrew Scott Liszewski, Brooklyn, NY (US); Steve Kichul Lee, New York, NY (US)

(73) Assignee: NEW YORK SOCIETY FOR THE RELIEF OF THE RUPTURED AND CRIPPLED, MAINTAINING THE HOSPITAL FOR SPECIAL SURGERY, New York, NY (US)

( * ) Notice: Subject to any disclaimer, the term of this patent is extended or adjusted under 35 U.S.C. 154(b) by 810 days.

(21) Appl. No.: 17/438,296

(22) PCT Filed: Mar. 23, 2020

(86) PCT No.: PCT/US2020/024283
§ 371 (c)(1),
(2) Date: Sep. 10, 2021

(87) PCT Pub. No.: WO2020/191404
PCT Pub. Date: Sep. 24, 2020

(65) Prior Publication Data
US 2022/0183671 A1 Jun. 16, 2022

Related U.S. Application Data

(60) Provisional application No. 62/821,498, filed on Mar. 21, 2019.

(51) Int. Cl.
*A61B 17/72* (2006.01)
*A61B 17/70* (2006.01)

(52) U.S. Cl.
CPC ...... *A61B 17/7291* (2013.01); *A61B 17/7053* (2013.01)

(58) Field of Classification Search
CPC ............ A61B 17/7216; A61B 17/7225; A61B 17/7291; A61B 2017/681; A61B 17/68;
(Continued)

(56) References Cited

U.S. PATENT DOCUMENTS 7,867,280 B2 * 1/2011 Goble ................... A61F 2/4202
623/20.14
2002/0120270 A1 * 8/2002 Trieu ...................... A61F 2/446
606/279

(Continued)

FOREIGN PATENT DOCUMENTS

WO WO-8806022 A1 * 8/1988 ........... A61B 17/823

OTHER PUBLICATIONS

PCT International Preliminary Report on Patentability in International Appln. No. PCT/US2020/024283, dated Sep. 30, 2021, 8 pages.
(Continued)

*Primary Examiner* — Julianna N Harvey
(74) *Attorney, Agent, or Firm* — Fish & Richardson P.C.

(57) ABSTRACT

A system includes an interosseous coupler and a driver. The interosseous coupler includes a first anchor; a second anchor; and a tether extending between the first anchor and the second anchor. The driver is configured to couple to the first anchor and the second anchor and apply rotational force to the first anchor and the second anchor.

20 Claims, 29 Drawing Sheets

(58) Field of Classification Search
CPC ............ A61B 17/7022; A61B 17/7019; A61B 17/7053; A61B 17/82; A61B 17/842
See application file for complete search history.

(56) References Cited

U.S. PATENT DOCUMENTS

| | | | | |
|---|---|---|---|---|
| 2006/0264944 | A1* | 11/2006 | Cole | A61B 17/725 606/62 |
| 2008/0177291 | A1* | 7/2008 | Jensen | A61B 17/68 606/301 |
| 2008/0269743 | A1 | 10/2008 | McNamara et al. | |
| 2011/0276099 | A1* | 11/2011 | Champagne | A61B 17/7258 606/328 |
| 2012/0016428 | A1* | 1/2012 | White | A61B 17/68 606/86 R |
| 2013/0184708 | A1 | 7/2013 | Bonfix et al. | |
| 2014/0005669 | A1* | 1/2014 | Graham | A61B 17/72 606/62 |
| 2014/0088654 | A1* | 3/2014 | Marasco | A61B 17/7225 606/328 |
| 2014/0114365 | A1 | 4/2014 | Sucec et al. | |
| 2014/0194907 | A1 | 7/2014 | Bonutti et al. | |
| 2017/0112539 | A1* | 4/2017 | Hayes | A61B 17/708 |
| 2018/0008255 | A1 | 1/2018 | Fallin et al. | |
| 2019/0343562 | A1* | 11/2019 | Lintula | A61B 17/8872 |

OTHER PUBLICATIONS

PCT International Search Report and Written Opinion in International Appln. No. PCT/US2020/024283, dated Jun. 26, 2020, 10 pages.

Extended European Search Report in European Appln. No. 20773560.6, dated Nov. 7, 2022, 7 pages.

Office Action in European Appln. No. 20773560.6, mailed on Dec. 15, 2023, 5 pages.

* cited by examiner

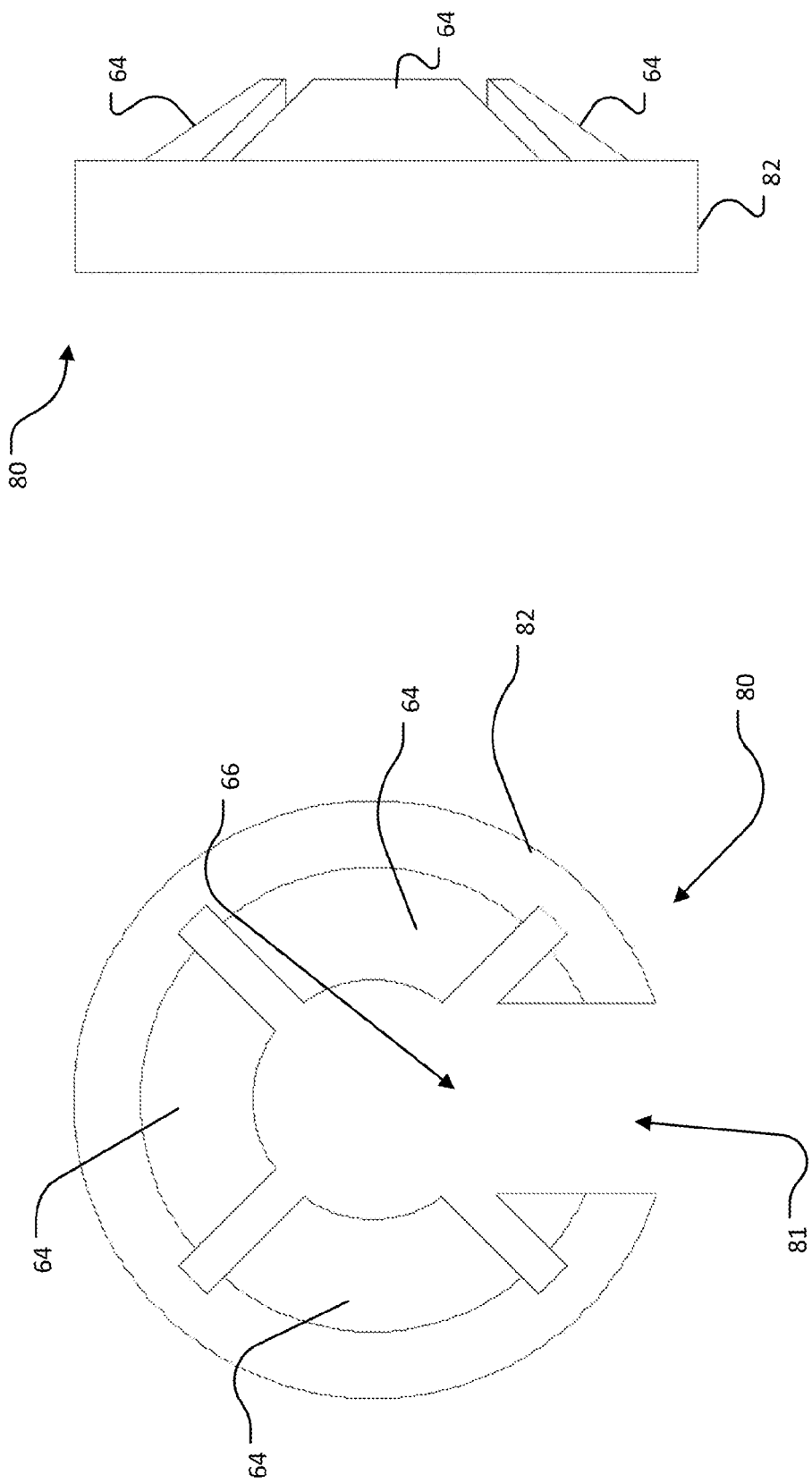

INTEROSSEOUS COUPLER

TECHNICAL FIELD

This disclosure relates to orthopedic systems, methods, and devices.

BACKGROUND

Joints such as the wrist and ankle have complex bone and ligamentous structures. Ruptures of the scapholunate ligament of the wrist are common and often require the coupling of the lunate and scaphoid carpal bones to be restored in order to restore natural joint motion and stability. Current procedures involve complex techniques, such as using an autograft transplant to replace the ligament between these two carpal bones.

SUMMARY

In one aspect, a system includes an interosseous coupler and a driver. The interosseous coupler includes a first anchor; a second anchor; and a tether extending between the first anchor and the second anchor. The driver is configured to couple to the first anchor and the second anchor and apply rotational force to the first anchor and the second anchor.

Embodiments can include one or more of the following features in any combination.

In certain embodiments, the system includes a pawl configured to be positioned over the tether and maintain a position of the tether within at least one of the first anchor and the second anchor.

In some embodiments, the driver is configured to releasably couple to the pawl and position the pawl over the tether.

In certain embodiments, the driver includes a handle; a shaft extending from the handle; and a tip coupled to the shaft. The tip is configured to couple with a driver interface of at least one of the first anchor and the second anchor.

In some embodiments, a cross-section of the tip along a plane orthogonal to a longitudinal axis of the driver is a non-circular cross section.

In certain embodiments, the tip includes a lumen extending through the tip; and an opening positioned on a side of the tip and sized to allow the tether to pass through the opening.

In another aspect, an interosseous coupler includes a first anchor; a second anchor; a tether extending between the first anchor and the second anchor; and a pawl configured to be positioned over the tether and maintain a position of the tether within at least one of the first anchor and the second anchor.

Embodiments can include one or more of the following features in any combination.

In some embodiments, the pawl includes a base; and a plurality of leaflets coupled to the base, the leaflets defining a central opening through the pawl.

In certain embodiments, the pawl is configured to enable insertion of the tether through the pawl in a first direction, and the pawl resists movement of the tether in a second direction, the second direction being opposite the first direction.

In some embodiments, an exterior surface of at least one of the first anchor and the second anchor is threaded.

In another aspect, a method includes positioning a first anchor in a first pilot hole in a first bone using a driver; positioning a second anchor in a second pilot hole in a second bone opposite the first bone using the driver; positioning a pawl over a tether using the driver, the tether extending through the first anchor and the second anchor and spanning across an interosseous space between the first anchor and the second anchor; and adjusting tension along the tether.

Advantages of the systems, devices, and methods described herein can include a simplified system and technique for restoring joint motion and stability and function following ligament rupture. The systems, devices, and methods described herein can allow for placement of fixation devices using multiple placement approaches. For example, the devices described herein may be placed across two bones by drilling a pilot hole through the surface of one of the two bones being coupled via the device. In addition, in some implementations, the devices described herein may be placed across two bones by drilling a pilot hole through a surface of each of the bones being coupled via the device. The systems, devices, and methods described herein can also provide improved tensioning between two bones. In addition, the systems, devices, and methods described herein allow for placement of fixation devices using a knotless technique, which eliminates the risk associated with knot slippage when placing fixation devices or autografts using a suture.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 31 depicts a top view of an alternate pawl device.

FIG. 32 depicts a side view of the pawl device of FIG. 31.

DETAILED DESCRIPTION

Figure 1:
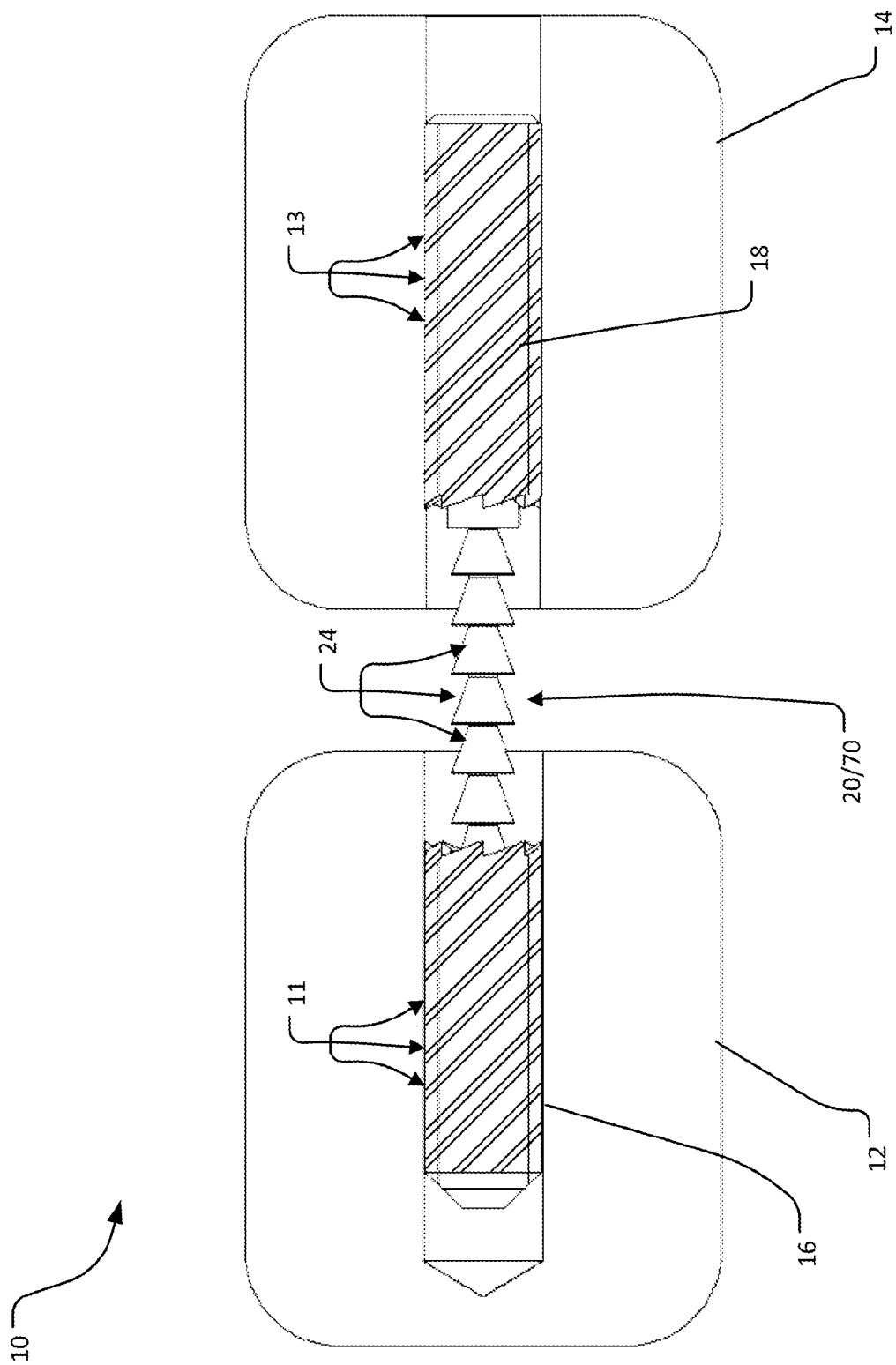
FIG. 1 depicts an interosseous coupler implanted in the wrist of a patient.
Figure 2:
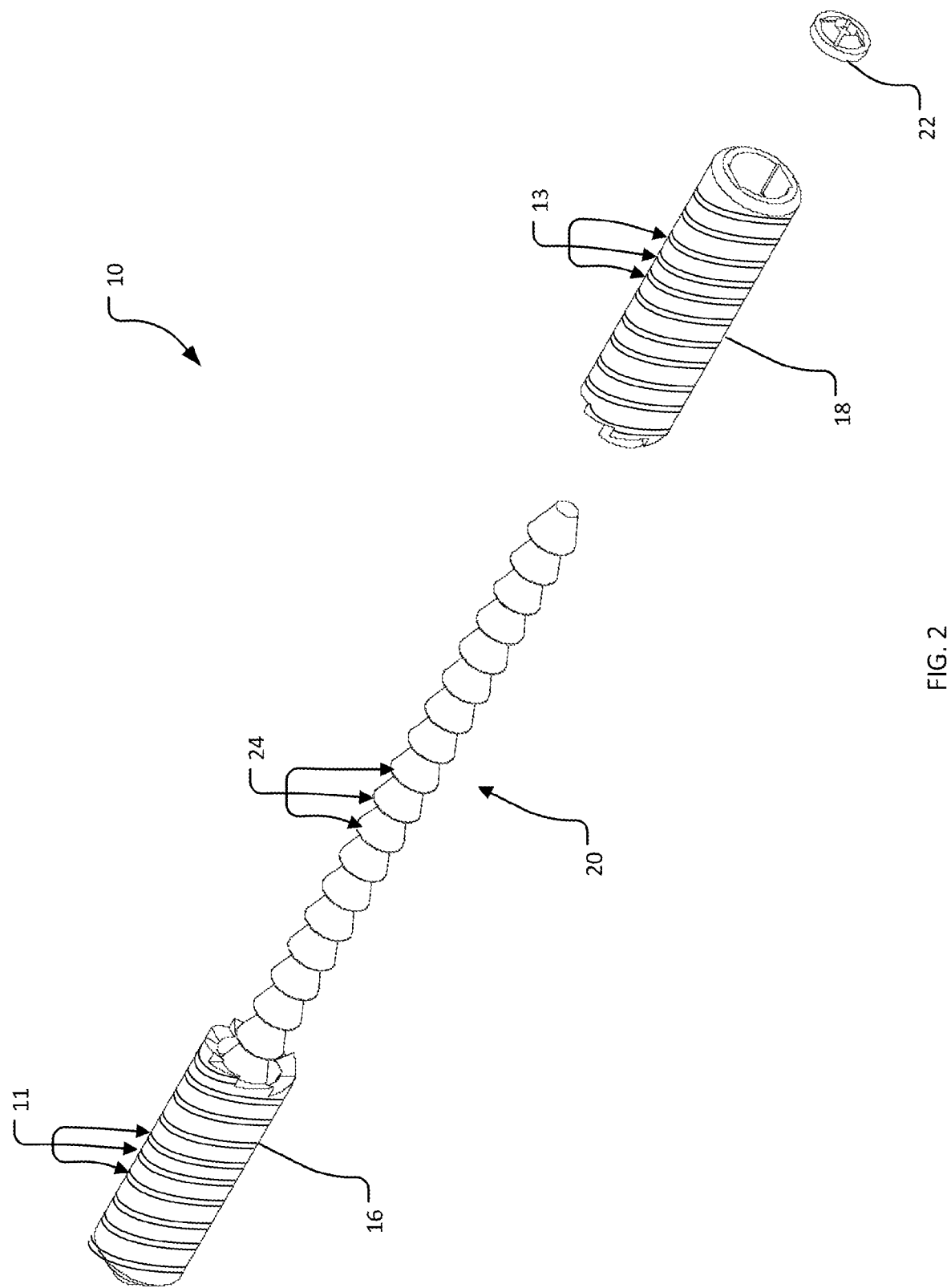
FIG. 2 depicts an exploded view of the interosseous coupler 10 of FIG. 1.

Referring to FIG. 1, an interosseous coupler 10 is depicted as being implanted across the lunate bone 12 and scaphoid bone 14 in the wrist of a patient. As depicted in FIGS. 1 and 2, the interosseous coupler 10 includes a first anchor 16, a second anchor 18, a tether 20, and a pawl 22. Both the first anchor 16 and the second anchor 18 include threads 11, 13 on the exterior surfaces of the anchors 16, 18. As will be described in further detail herein, holes can be drilled into the lunate 12 and the scaphoid 14 to allow the first anchor 16 and the second anchor 18 to be implanted in the lunate 12 and scaphoid 14, respectively, and the tether 20 to span and provide tension across the interosseous space 70 between the lunate 12 and scaphoid 14, as depicted in FIG. 1. The threads 11, 13 hold the anchors 16, 18 in place after the anchors 16, 18 are screwed into position using a driver (e.g., driver 50 of FIG. 12). In some implementations, the first anchor 16 and/or the second anchor 18 are configured to be driven in two directions (e.g., forwards and backwards) through the bones 12, 14 using a driver tool (e.g., driver 50 of FIG. 12).

Figure 3:
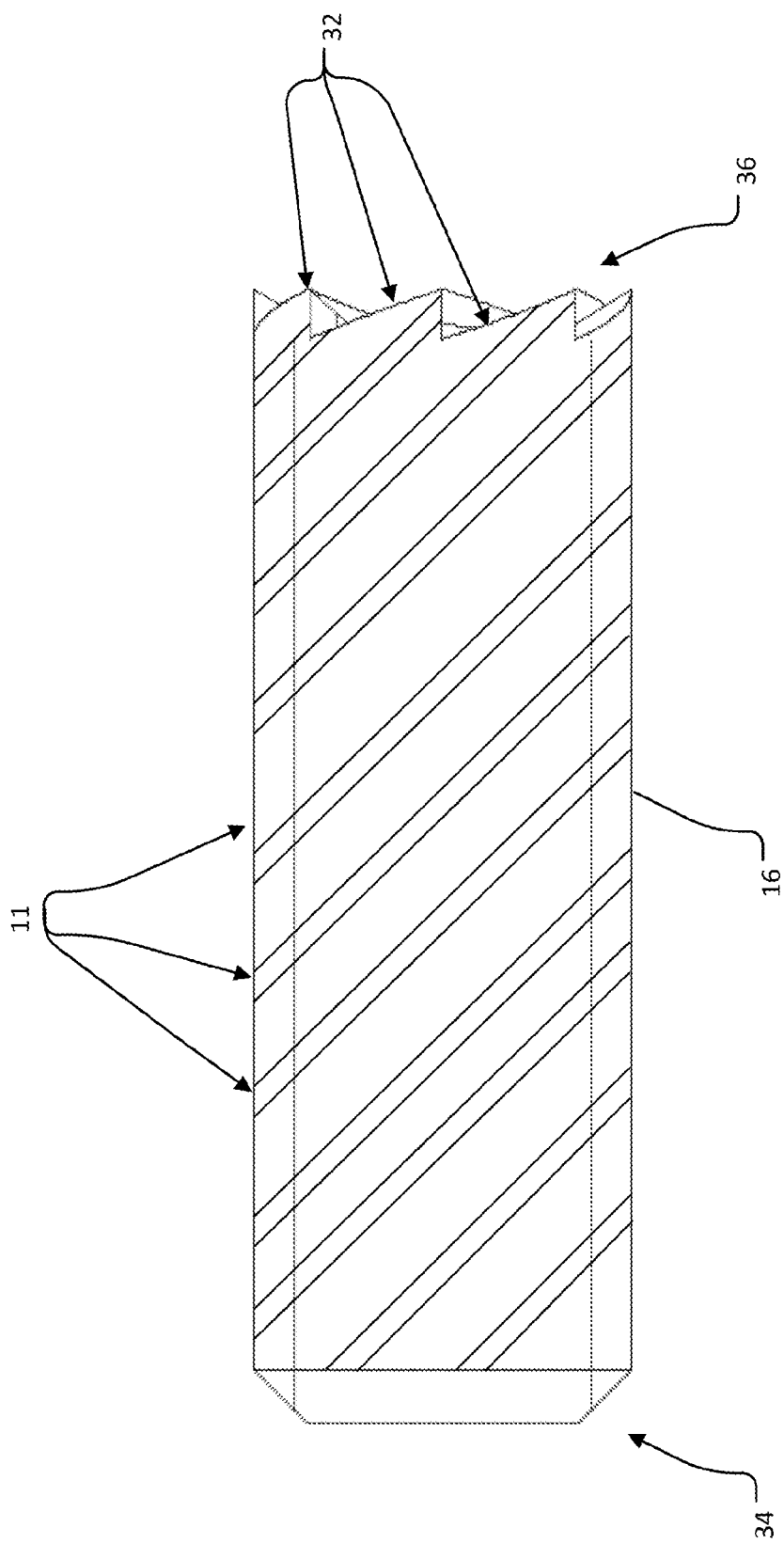
FIG. 3 depicts a front view of a first anchor of the interosseous coupler 10 of FIG. 1.
Figure 5:
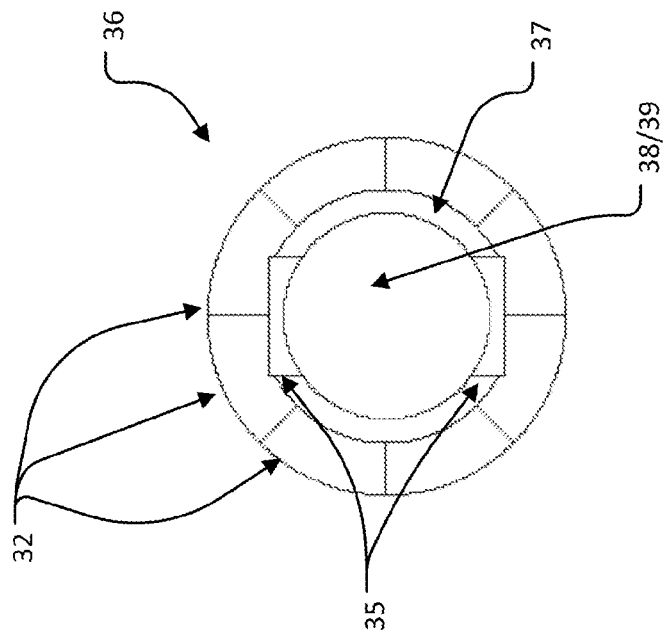
FIG. 5 depicts a bottom view of the first anchor of FIG. 3.
Figure 4:
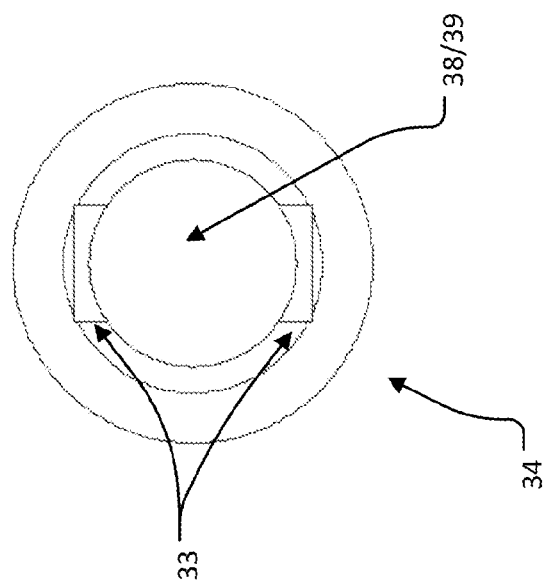
FIG. 4 depicts a top view of the first anchor of FIG. 3.
Figure 6:
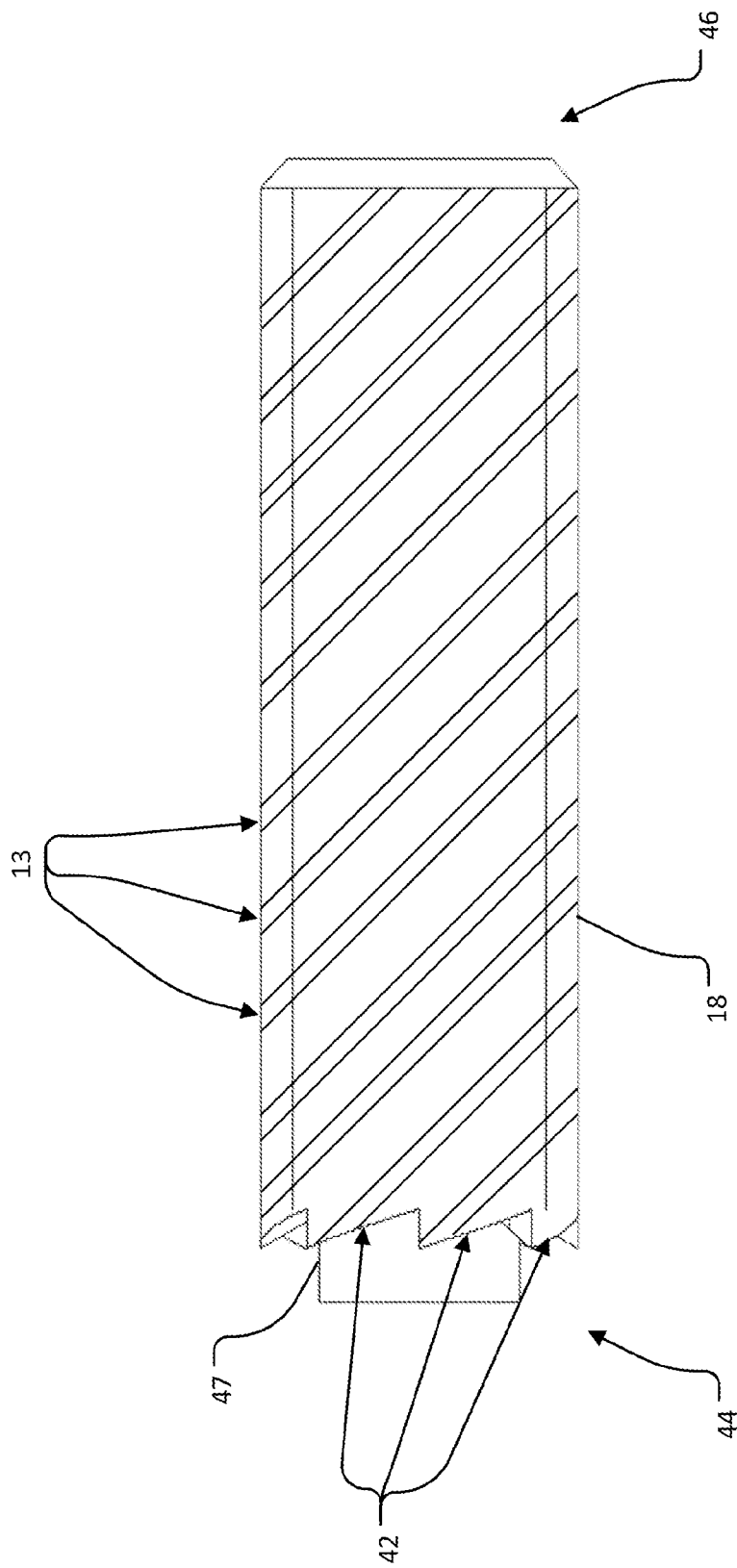
FIG. 6 depicts a front view of a second anchor of the interosseous coupler 10 of FIG. 1.
Figure 8:
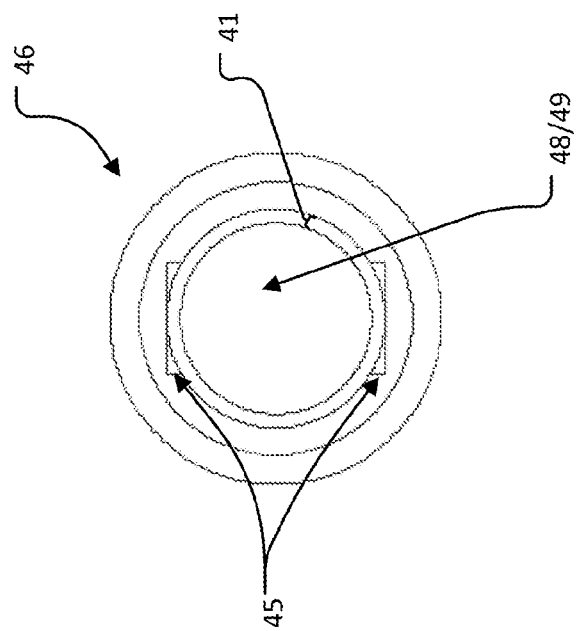
FIG. 8 depicts a bottom view of the second anchor of FIG. 3.
Figure 7:
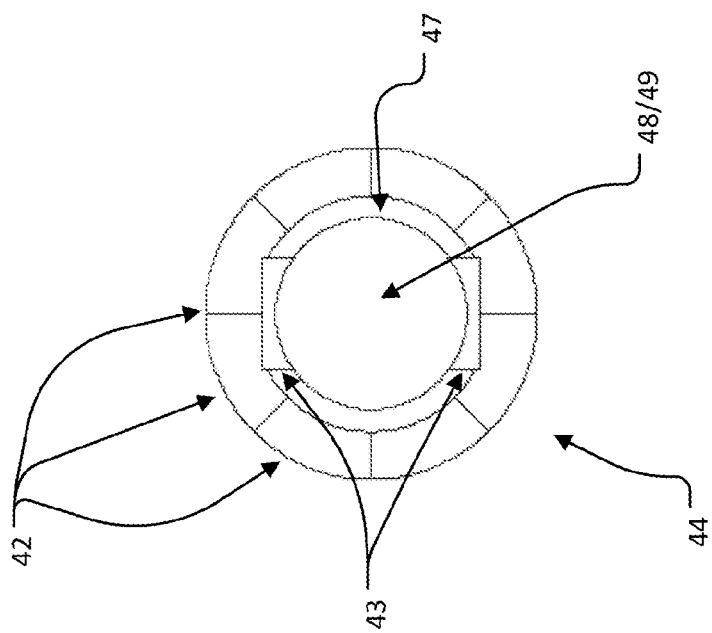
FIG. 7 depicts a top view of the second anchor of FIG. 3.

FIG. 3 depicts a front view of the first anchor 16 and FIGS. 4 and 5 depict top and bottom views, respectively, of the first anchor 16. FIG. 6 depicts a front view of the second anchor 18 and FIGS. 7 and 8 depict top and bottom views, respectively, of the second anchor 18. As can be seen in FIGS. 4 and 5, the first anchor 16 includes a central opening 38 that defines a lumen 39 through the first anchor 16. The central opening 38 of the first anchor 16 is sized to allow the tether 20 of the interosseous coupler 10 to be positioned within the lumen 39 of the first anchor 16. Similarly, as can be seen in FIGS. 7 and 8, the second anchor 18 includes a central opening 48 that defines a lumen 49 through the second anchor 18. The central opening 48 of the second anchor 18 is also sized to allow the tether 20 of the interosseous coupler 10 to be positioned within the lumen 49 of the second anchor 18.

Figure 9:
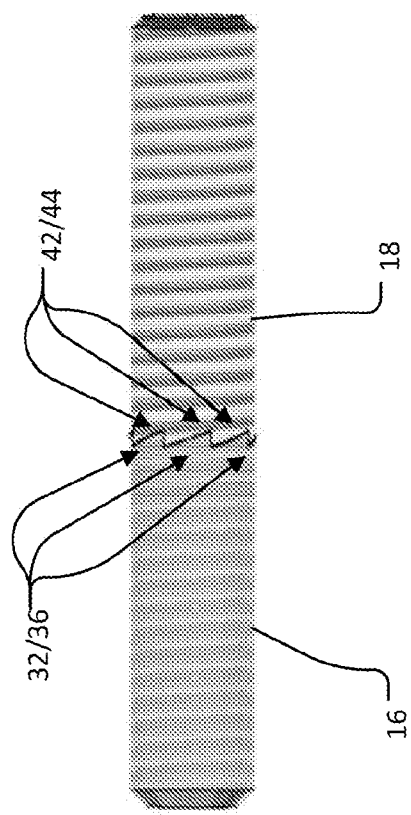
FIG. 9 depicts the first anchor of FIG. 3 and the second anchor of FIG. 5.

As can be seen in FIGS. 3 and 5, the first anchor 16 includes a series of radial ramps 32 positioned around the bottom circumferential edge 36 of the first anchor 16. In addition, as can be seen in FIGS. 6 and 7, the second anchor 18 includes a series of corresponding radial ramps 42 positioned around the top circumferential edge 44 of the second anchor 18. The ramps 32, 42 on the first and second anchors 16, 18 enable the first anchor 16 to be releasably coupled to the second anchor 18. For example, as depicted in FIG. 9, when the bottom 36 of the first anchor 16 is positioned against the top 44 of the second anchor 18, the ramps 32 of the first anchor 16 are positioned against and nested within the ramps 42 of the second anchor 18.

In addition, as depicted in FIGS. 6 and 7, the second anchor 18 includes a circular projection 47 that extends from the top 44 of the second anchor 18. As depicted in FIG. 5, the first anchor 16 includes a recess 37 proximate the bottom 36 of the first anchor 16. The circular projection 47 of the second anchor 18 is configured to releasably couple with the recess 37 in the lumen 39 of the first anchor 16 proximate the bottom 36 of the first anchor 16. The coupling of the projection 47 extending from the top 44 of the second anchor 18 with the recess 37 proximate the bottom 36 of the first anchor 16 can further enhance the releasable coupling of the anchors 16, 18 during implantation and positioning of the anchors 16, 18 in the bones 12, 14.

Due to the angular geometry of the ramps 32, 42, when the first anchor 16 and second anchor 18 are coupled such that ramps 32 of the first anchor 16 are positioned against and nested within the ramps 42 of the second anchor 18, the anchors 16, 18 resist relative rotational movement or disconnection when a clockwise rotational force is applied to the second anchor 18. Conversely, when the first anchor 16 and the second anchor 18 are coupled together as depicted in FIG. 9 and a counterclockwise rotational force is applied to the second anchor 18, the second anchor 18 will separate from the first anchor 16 and the ramps 32, 42 will decouple as a result of the angular geometry of the ramps 32, 42. As such, the ramps 32, 42 of the anchors 16, 18 enable directionally-dependent tightening and loosening between the first anchor 16 and the second anchor 18, which allows for temporary coupling between the first anchor 16 and the second anchor 18 during implantation of the interosseous coupler 1.

The anchors 16, 18 can be made of any suitable biocompatible material including, but not limited to, titanium, titanium alloy, stainless steel, cobalt chromium, and polyether ether ketone (PEEK). In one preferred embodiment, the anchors 16, 18 are made of a titanium alloy.

Figure 11:
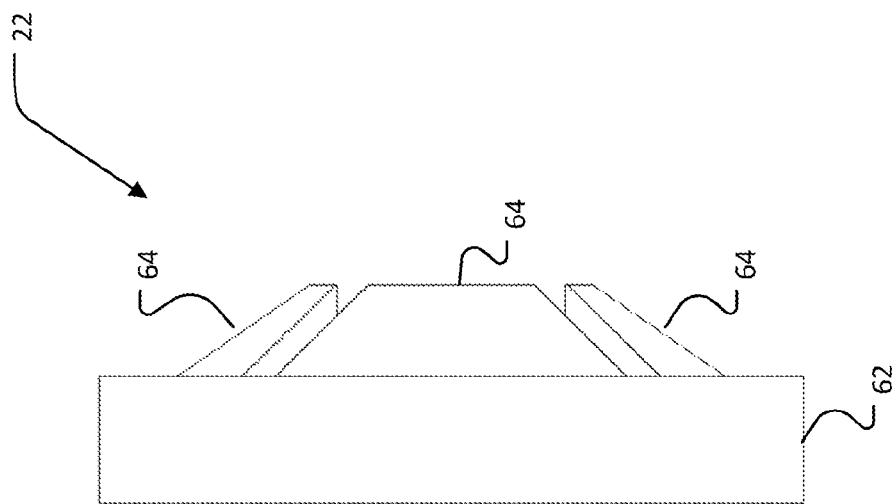
FIG. 11 depicts a side view of the pawl device of FIG. 10.
Figure 10:
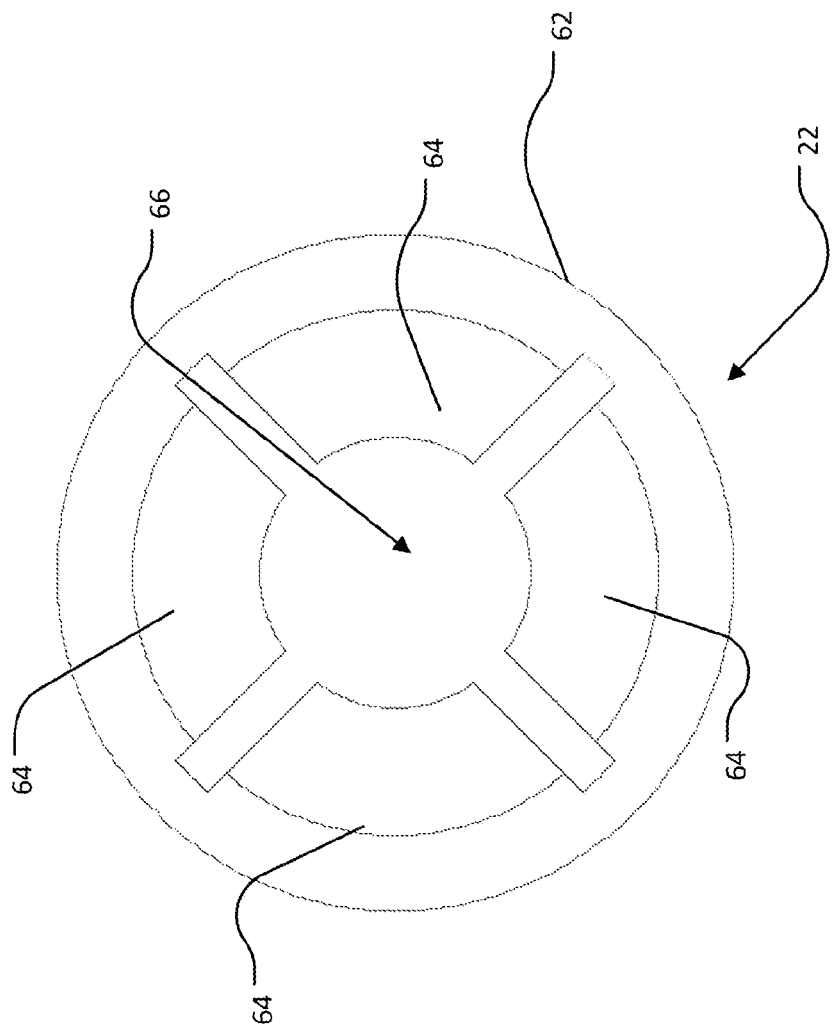
FIG. 10 depicts a top view of a pawl device of the interosseous coupler 10 of FIG. 1.

Referring to FIGS. 10 and 11, the pawl 22 of the interosseous coupler 10 includes a base 62 and a set of leaflets 64. The leaflets 64 of the pawl are each attached to the base 62 and extend inward towards the center of the pawl 22. As depicted in FIG. 10, the inner edges of the leaflets 64 form a central opening 66 through the pawl 22.

The base 62 of the pawl 22 can be made of any suitable biocompatible material, including, but not limited to, titanium, titanium alloy, stainless steel, cobalt chromium, polyethylene, and cross-linked polyethylene. In one preferred embodiment, the base 62 of the pawl 22 is made of polyethylene. The leaflets 64 of the pawl 22 can be made of any suitable biocompatible material, including, but not limited to, stainless steel, cobalt chromium, polyethylene, or cross-linked polyethylene. In one preferred embodiment, the leaflets 64 of the pawl 22 are made of polyethylene.

In some implementations, the base 62 and the leaflets 64 are made of different types of material. In some implementations, the base 62 and the leaflets 64 are made of same type of material. Further in some implementations, the base 62 and leaflets 64 are formed or molded as a single piece. In some implementations, leaflets 64 and base 62 are formed as separate pieces, and the leaflets 64 are attached to the base 62.

As described in further detail herein, the tether 20 of the interosseous coupler 10 can be inserted through the central opening 66 of the pawl 22, and the leaflets 64 of the pawl 22 are configured to capture the tether 20 and maintain the position of the tether 20. In some implementations, the leaflets 64 of the pawl 22 are configured to deform and/or flex without breaking or dislodging from the base 62 in order to accommodate a tether 20 being inserted through the central opening 66 of the pawl 22. In some implementations, both the tether 20 and the leaflets 64 of the pawl 22 elastically deform as the tether 20 is drawn through the pawl 22. In some implementations, the pawl 22 is configured to allow insertion of a tether 20 through the central opening 66 of the pawl 22 without deformation of the leaflets 64.

During implantation of the interosseous coupler 10, the pawl 22 is inserted into and positioned within the second anchor 18. For example, as depicted in FIG. 8, the lumen 40 of the second anchor 18 includes an inner lip 41 proximate the bottom 44 of the second anchor 18. The inner lip 41 forms a housing for the pawl 22, and the position of the pawl 22 within the second anchor 18 is secured by the inner lip 41. For example, once the pawl 22 is properly positioned within the second anchor 18 against the inner lip 41, the inner lip 41 prevents movement of the pawl 22 along the longitudinal axis of the second anchor 18 towards the interosseous space 70. As will be described in further detail herein, the pawl 22 is configured to engage with the tether 20 of the interosseous coupler 10 in order to assist in maintaining the position of the tether 20 within the second anchor 18. As such, by helping maintain the position of the pawl 22 within the second anchor 18, the inner lip 41 of the second anchor 18 can help maintain the tension along the tether 20 inserted through the pawl 22.

As depicted in FIG. 1, the tether 20 can be inserted through both the first anchor 16 and the second anchor 18 (referred to collectively as anchors 16, 18), and spans across the interosseous space 70 between the lunate 12 and scaphoid 14 when the anchors 16, 18 are properly implanted in the lunate 12 and scaphoid 14. The tether 20 can be attached to the first anchor 16 at an end of the first anchor 16 (e.g., at the top 34 of the first anchor 16) and pulled through the second anchor 18 on a second, opposite end in order to create tension between each of the anchors 16, 18. By providing tension across the interosseous space 70 between the lunate 12 and scaphoid 14, the tether 20 helps maintain proper alignment of the lunate 12 and the scaphoid 14, as well as proper tension across the interosseous space 70, which helps maintain the proper relative motion and kinematics of the bones 12, 14.

In some implementations, as depicted in FIG. 2, the tether 20 is attached to the top 34 of the first anchor 16 prior to implantation of the anchors 16, 18. For example, the end of the tether 20 to be attached to the first anchor 16 can include a portion that is wider than an inner lip (not shown) in the lumen 39 of the first anchor 16 proximate the top 34 of the first anchor 16. The tether 20 can deform slightly as the end of tether 20 is pushed over the inner lip in the lumen 39 of the first anchor 16. In some implementations, the end of the tether 20 is narrow, and the narrow end of tether 20 is inserted through the inner lip of the first anchor 16 without deforming and is pulled through the top 34 of the first anchor 16 until a wider portion of the tether 20 is seated against the inner lip in the lumen 39 of the first anchor 16. Once the end of the tether 20 has been pushed over the inner lip of the first anchor 16 and positioned such that a wider portion of the tether 20 is resting against the inner lip, the inner lip of the first anchor 16 prevents movement of the tether 20 along the longitudinal axis of the first anchor 16 towards the interosseous space 70, thus coupling the tether 20 to the first anchor 16. In some implementations, the tether 20 and the first anchor 16 are formed as a single, unitary object, such that the tether 20 cannot be removed from the first anchor 16 without causing damage to the tether 20.

The tether 20 can be made of any suitable material, including, but not limited to, polyethylene, nylon, polyethylene reinforced with nylon, polyester, polyether ether ketone (PEEK), and polyvinylidene fluoride (PVDF). In one preferred embodiment, the tether 20 is made of polyethylene. In some embodiments, the tether 20 can be made with a radiopaque material. In some implementations, the tether 20 is reinforced with fibers to provide the tether 20 with enhanced tensile strength. In some implementations, the material used to form the tether 20 has similar mechanical properties (e.g., Young's modulus and yield strength) to the mechanical properties of the ligament or tendon that the tether 20 is being used to support or replace.

As depicted in FIGS. 1 and 2, the tether 20 includes a series of attached, repeating elements 24 that are configured to engage with portions of the anchors 16, 18 in order to provide tension between the anchors 16, 18. For example, as depicted in FIGS. 1 and 2, the tether elements 24 are a series of attached, regularly-spaced cones.

The cone shaped tether elements 24 are made of a flexible plastic material, such as polyethylene, nylon, polyethylene reinforced with nylon, polyester, polyether ether ketone (PEEK), or polyvinylidene fluoride (PVDF). In one preferred embodiment, the elements 24 are made of polyethylene. The plastic forming the tether elements 24 is sufficiently flexible such that no particles fall from the tether elements 24 as the elements 24 are drawn through the pawl 22. In some implementations, the material used to form the elements 24 is cross-linked in order to prevent particles shedding from the elements 24 when the tether 20 is drawn through the pawl 22.

In some implementations, the elements 24 of the tether 20 are molded as a single piece. In some embodiments, the tether 20 includes a central portion, and the elements 24 are each mounted onto or otherwise attached to the central portion of the tether 20.

The conical shape of the elements 24 of the tether 20 depicted in FIGS. 1 and 2 allow for the tether 20 to be inserted through the anchors 16, 18 and the pawl 22 without requiring rotational alignment between the tether 20, the anchors 16/18, or the pawl 22.

By adjusting the length of the tether 20 between the first anchor 16 and the second anchor 18, the tension between the anchors 16, 18 can be adjusted. For example, in some implementations, the elements 24 of the tether 20 are designed to fit through the central opening 66 of the pawl 22 in a first direction, but cannot be pulled out through the pawl 22 in the opposite direction. For example, as depicted in FIGS. 1 and 2, the elements 24 forming the tether 20 have a conical shape such that the diameter of the elements 24 expands along the length of each element 24. As a result of this conical shape, each element 24 can be pulled through central opening 66 and leaflets 64 of the pawl 22 in a first direction (e.g., left to right) with the narrow end of the elements 24 leading, but once pulled through the central opening 66 of the pawl 22, the elements 24 cannot be pulled back out of the pawl 22 in the opposite direction (e.g., right to left) due to the increased diameter of the wide end of the elements 24. As a result, when a first end of the tether 20 is stationary, for example, due to being connected to the first anchor 16, threading the second, opposite end of the tether 20 through the pawl 22 creates a ratcheting or zip-tie effect that can be used to generate tension along the tether 20 between the anchors 16, 18. As previously discussed, in some implementations, the leaflets 64 of the pawl 22 elastically deform or flex to accommodate the insertion of the tether 20 through the pawl 22. In addition, in some implementations, the conical elements 24 of the tether are configured to deform as the elements 24 are inserted through the pawl 22. Such deformation of the conical elements 24 of the tether 20 can help further support the ratcheting function of the tether 20.

Figure 13:
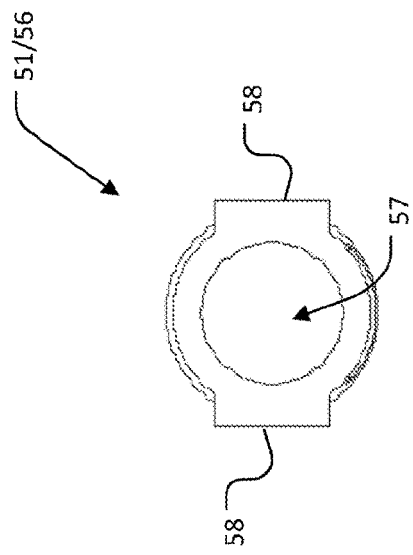
FIG. 13 depicts a top view of a driver tip of the driver device of FIG. 12.
Figure 12:
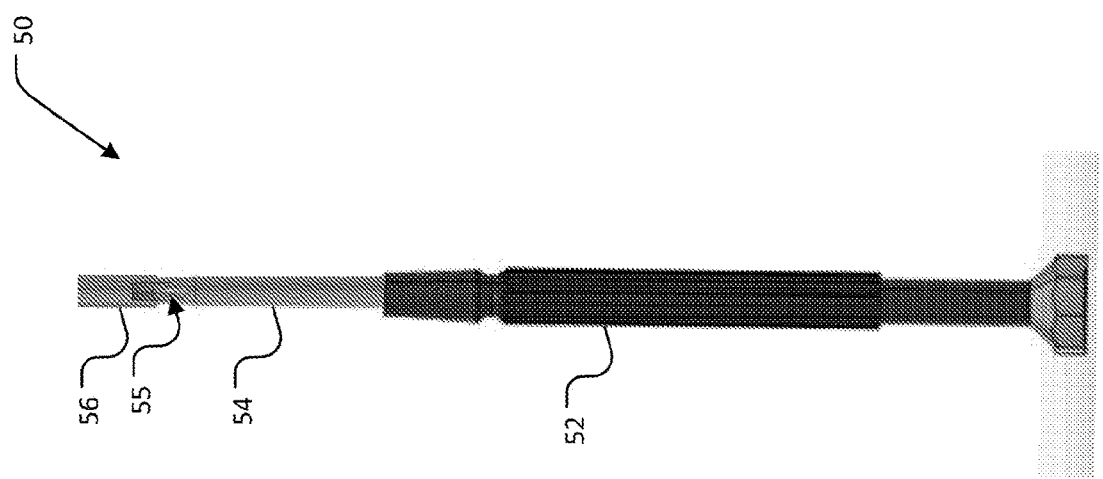
FIG. 12 depicts a front view of an exemplary driver that can be used to implant the interosseous coupler 10 of FIG. 1.

In some implementations, a driver device is used to implant interosseous coupler 10. An example driver 50 for implanting the interosseous coupler 10 is depicted in FIGS. 12 and 13. As depicted in FIG. 12, the driver 50 includes a handle 52, a shaft 54, and a tip 56. The shaft 54 is coupled to the handle 52, and the tip 56 is connected to the end of the shaft 54 opposite the handle 52.

The handle 52 of the driver may be used to manipulate the driver 50 and apply torque to an anchor 16, 18 coupled to the driver 50 when implanting the interosseous coupler 10. The rotation of the driver 50 via the rotation of the handle 52 seats the threads 11, 13 on the exterior surface of the anchors 16, 18 in the respective pilot holes (e.g., 72 and 74 of FIG. 14), and secures the anchors 16, 18 in position in the pilot holes. In some implementations, the handle 52 has an ergonomic design that provides the user with increased dexterity and an improved grip on the driver 50.

The driver 50 is configured to couple to an end of the first anchor 16 or the second anchor 18. As can be seen in FIGS. 12 and 13, the tip 56 includes flat outer surfaces 58. As can be seen in the top view of the driver tip 56 depicted in FIG. 13, the flat outer surfaces 58 of the tip 56 provide the driver tip 56 with a non-circular cross section, which allows the driver 50 to apply torque to the anchors 16, 18 when implanting the interosseous coupler 10. The top 34 and bottom 36 of the first anchor 16 each include a driver interface 33, 35 for coupling the respective end 34, 36 of the first anchor 16 to the driver 50. Similarly, the top 44 and bottom 46 of the second anchor 18 each include a driver interface 43, 45 for coupling the respective end 44, 46 of the second anchor 18 to the driver 50. As can be seen in FIGS. 4, 5, 7, 8, and 13, the cross section of the driver tip 56 corresponds to the slotted driver interfaces 33, 35, 43, 45 in each of the anchors 16, 18. As a result, the tip 56 of the driver 50 can be inserted into the driver interface 33, 35, 43, 45 of a respective end 24, 36, 44, 46 of an anchor 16, 18 to couple the driver tip 56 to the respective anchor 16, 18, and the handle 52 of the driver can be used to rotate the driver 50, which results in rotational force being applied to the respective anchor 16, 18. As will be described in further detail herein, by applying rotational force to each of the anchors 16, 18, the driver 50 can be used to thread and secure the first anchor 16 and second anchor 18 into holes drilled into the lunate 12 and scaphoid 14, respectively.

The driver tip 56 is also configured to couple to the pawl 22 of the interosseous coupler 10, and the driver 50 can be used to push the pawl 22 over the tether 20 of the interosseous coupler 10 to secure the tether 20. As depicted in FIG. 13, the driver tip 56 defines a lumen 57 through the center of the tip 56. In some implementations, the driver tip 56 is configured to couple to the pawl 22 with the leaflets 64 of the pawl 22 being positioned at least partially inside the lumen 57 of the driver tip 56 and the base 62 of the pawl 22 abutting the top surface 51 of the driver tip 56. The driver tip 56 is sized to support and cover the entire circumference of the base 62 of the pawl 22, which ensures that the pawl 22 does not shift or dislodge from the driver 50 when the pawl 22 is being pushed over the tether 20.

As depicted in FIG. 12, the driver tip 56 also includes an opening 55 that allows the tether 20 to be pulled through the lumen 57 of the driver tip 56 and outside the driver tip 56 in order to apply tension across the tether 20 during implantation of the interosseous coupler 10. For example, the pawl 22 of the interosseous coupler 10 can be coupled to the driver tip 56, and the handle 52 of the driver 50 can be used to push the pawl 22 over one or more of the elements 24 of the tether 20 while the end of the tether 20 simultaneously passes through lumen 57 of the driver tip 56 and is pulled through the opening 55 in driver tip 56 to generate tension across the tether 20.

In some embodiments, the driver 50 includes a cutting mechanism (discussed in more detail below) that can be used to cut the tether 20. For example, as explained in further detail herein, once the anchors 16, 18 have been implanted and the tether 20 has been adjusted to provide the desired tension between the anchors 16, 18, a cutting mechanism of the driver 50 can be used to trim any excess length of the tether 20 that extends outside the second anchor 18.

A first method of repairing a scapholunate ligament rupture using the interosseous coupler 10 will now be described with reference to FIGS. 14-25.

Figure 14:
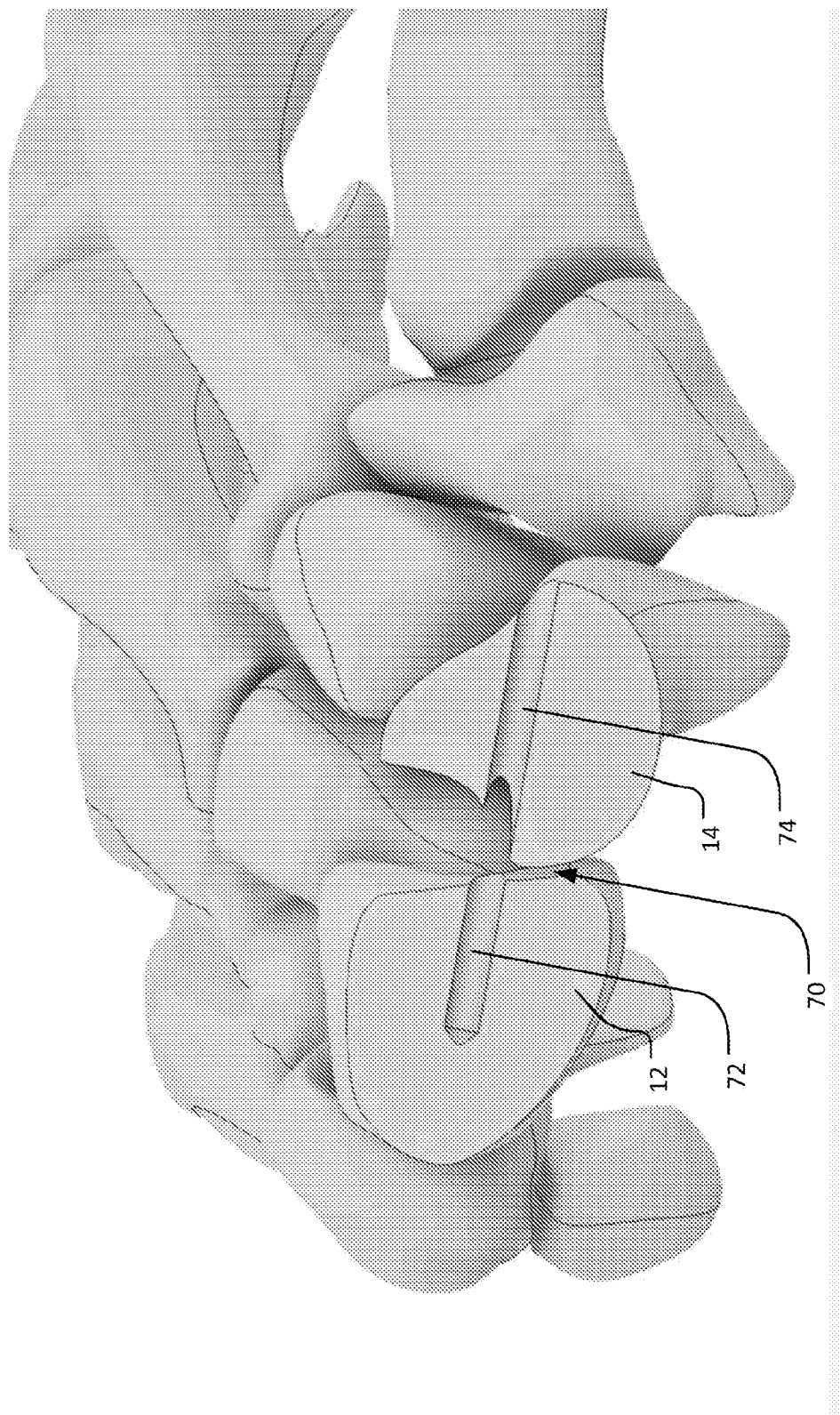
FIGS. 14-25 depict an exemplary method of implanting the interosseous coupler 10 of FIG. 1.

Prior to implanting the interosseous coupler 10, a drill tool (not shown) is inserted through the exterior surface of the scaphoid 14, through the scaphoid 14, through the interosseous space 70, and partially through the lunate 12 to form a scaphoid pilot hole 74 in the scaphoid 14 and a lunate pilot hole 72 in the lunate 12. As depicted in FIG. 14, by drilling the pilot holes 72, 74 from outside the scaphoid 74, the scaphoid pilot hole 74 extends through the entire width of the scaphoid 12, whereas the lunate pilot hole 72 only extends partially through the lunate 12. In some implementations, the lunate pilot hole 72 is drilled into the lunate 12 slightly distal to the midpoint of the lunate 12, and terminates proximate the proximal ulnar corner of the lunate 12. In some implementations, the scaphoid pilot hole 74 is drilled completely through scaphoid 14 proximate the ridge between the articular cartilage and the nonarticular cartilage of the scaphoid 14.

Figure 15:
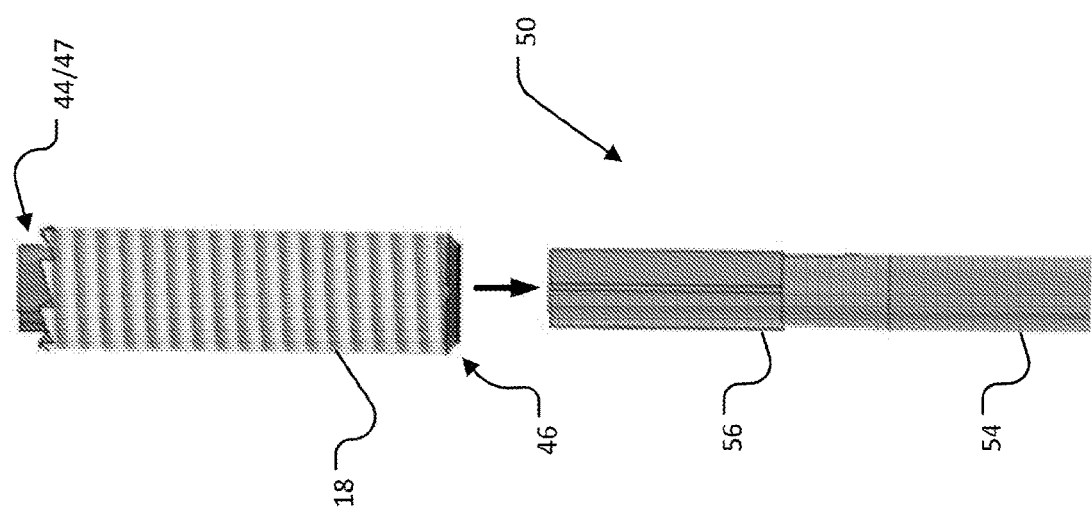
Figure 16:
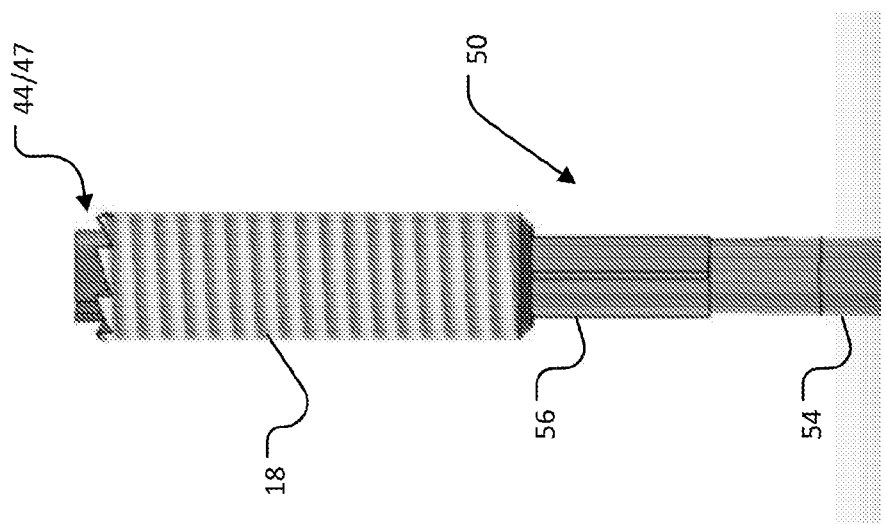

Referring to FIGS. 15 and 16, in order to prepare the interosseous coupler 10 for implantation, the second anchor 18 is coupled to the driver 50. For example, as depicted in FIGS. 15 and 16, a driver interface (e.g., driver interface 45 of FIG. 8) proximate the bottom 46 of the second anchor 18 is attached to the tip 56 of the driver 50. FIG. 16 depicts the second anchor 18 coupled to the tip 56 of the driver 50.

Figure 17:
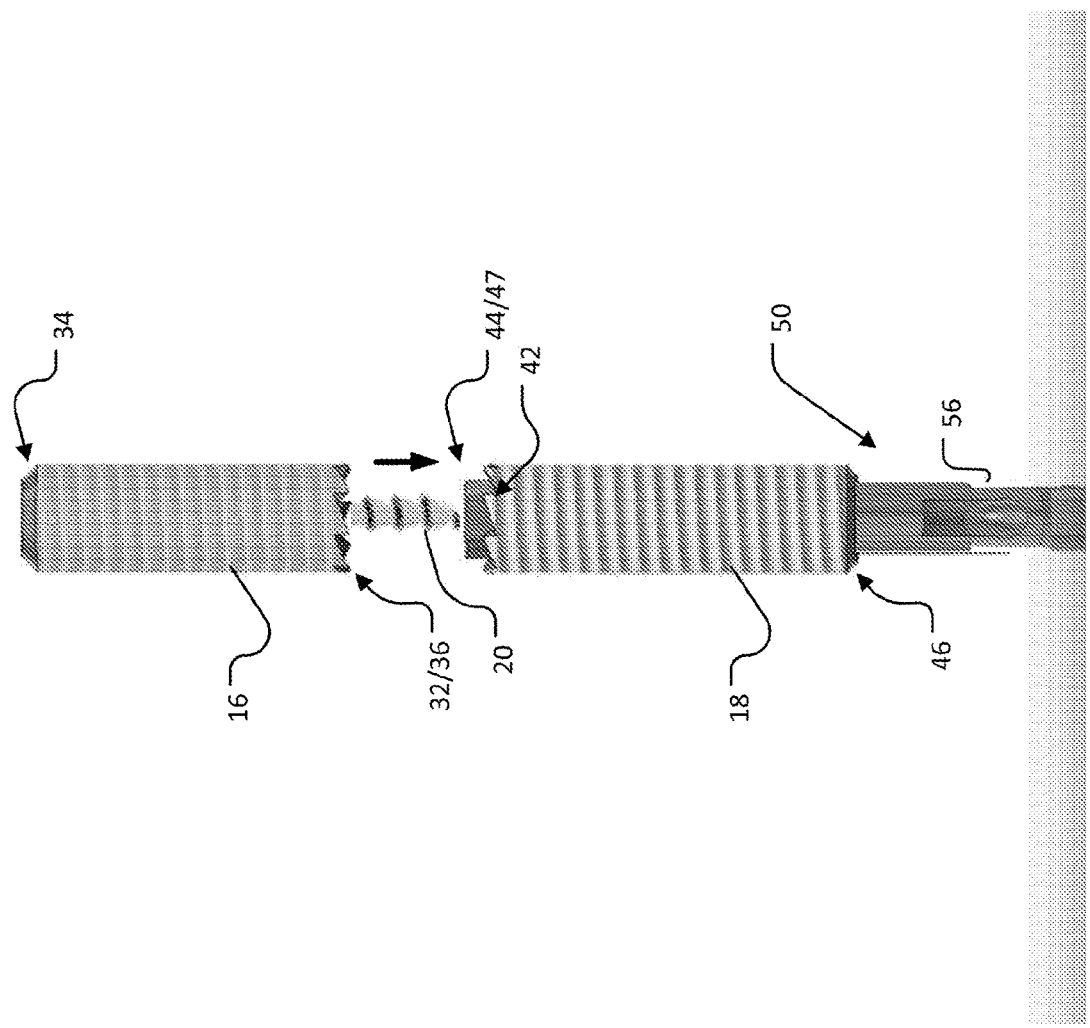
Figure 18:
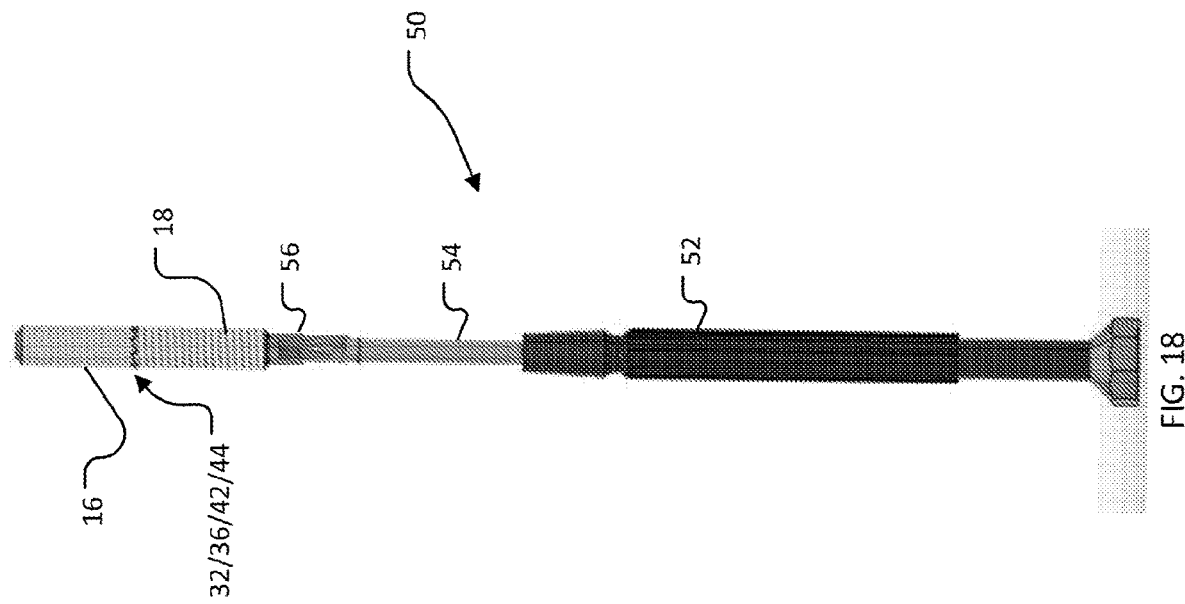

Referring to FIGS. 17 and 18, once the second anchor 18 is attached to the driver 50, the first anchor 16 is coupled to the second anchor 18. For example, as depicted in FIGS. 17 and 18, the ramps 32 on the bottom 36 of the first anchor 16 are aligned with the corresponding ramps 42 on the top 46 of the second anchor 18. Once the ramps 32, 42 are aligned, the first anchor 16 is lowered onto the second anchor 18 to interlock the ramps 36, 46 of the two anchors 16, 18 and couple the first anchor 16 to the second anchor 18. As previously discussed, in some implementations, the second anchor 18 includes a circular projection 47 that extends from the top 44 of the second anchor 18, and interfaces with a recess in the lumen of the first anchor 16 proximate the bottom 36 of the first anchor 16 (e.g., recess 37 depicted in FIG. 5). The coupling of the projection 47 extending from the top 44 of the second anchor 18 with the recess 37 proximate the bottom 36 of the first anchor 16 can further enhance the releasable coupling of the anchors 16, 18 during implantation and positioning of the anchors 16, 18.

In addition, if the tether 20 is not already attached to the top 34 of the first anchor 16, the user can insert the tether 20 through the lumen 39 of the first anchor and attach the end of the tether 20 to the top 44 of the first anchor 16. Once the tether 20 is inserted through and attached to the first anchor 16, the first anchor 16 can be positioned on and coupled to the second anchor 18, as described above. When positioning the first anchor 16 on the second anchor 18, the length of tether 20 extending out the bottom 36 of the first anchor 16 is inserted into the lumen 49 of the second anchor 18 through the central opening 48 of the second anchor 18, as depicted in FIG. 17.

Figure 19:
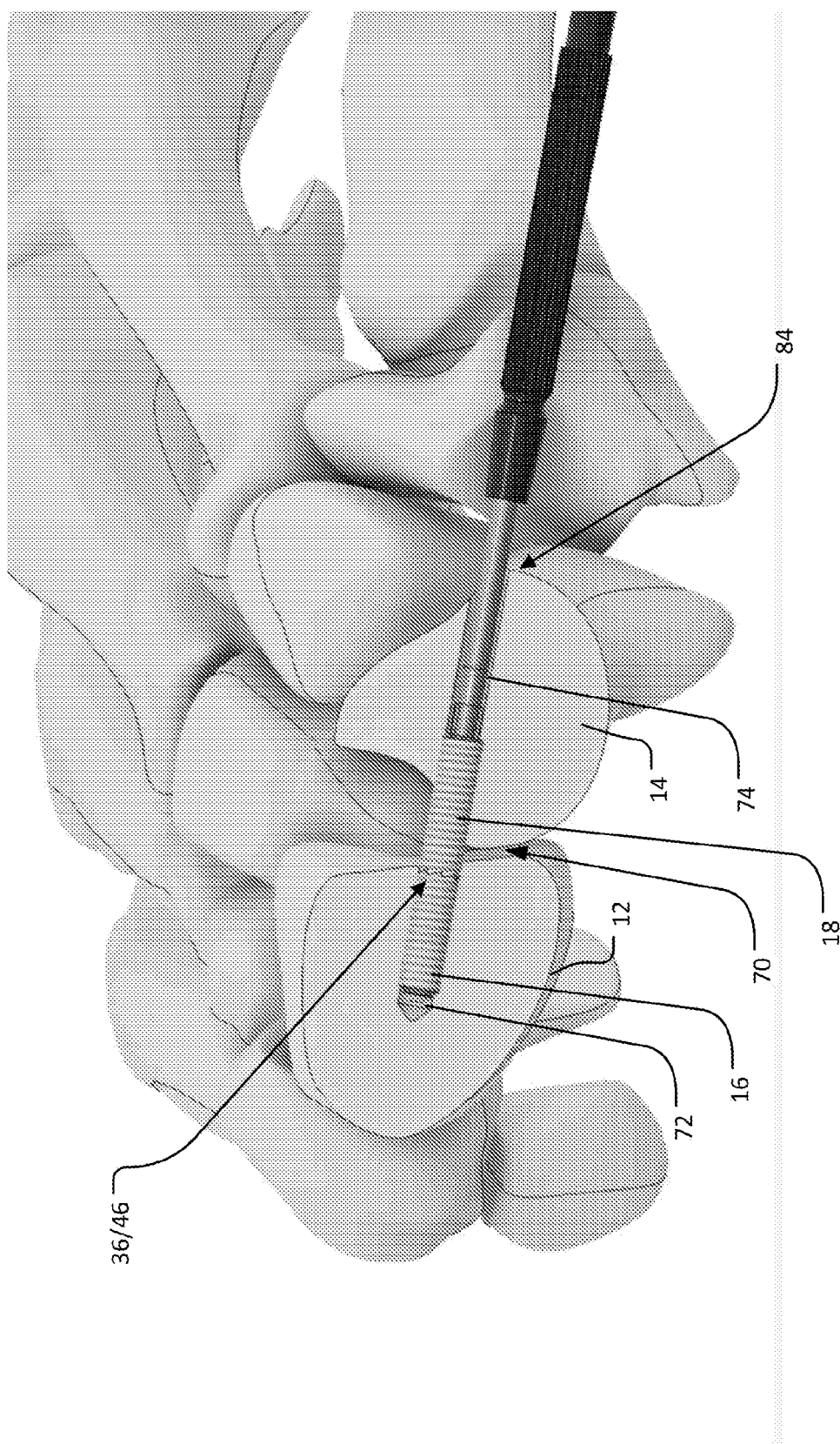

Referring to FIG. 19, once the second anchor 18 is coupled to the driver 50 and the first anchor 16 is releasably coupled to the second anchor 18, and the tether 20 has been inserted into both the first anchor 16 and the second anchor 18, the user can use the handle 52 of the driver 50 to control the driver 50 to implant the first anchor 16 in the lunate pilot hole 72 in the lunate 12. For example, the user can align the coupled anchors 16, 18 with the external opening 84 of the scaphoid pilot hole 74. Once the anchors 16, 18 are aligned with the pilot hole 74, the user can use the handle 52 to turn the driver 50 in a clockwise direction to position and secure the first anchor 16 in the lunate pilot hole 72. As depicted in FIG. 19, the user continues to rotate the driver 50 in a clockwise direction until the entire first anchor 16 is positioned within and secured to the lunate pilot hole 72. The threads 11 along the external surface of the first anchor 16 help to secure the first anchor 16 in the pilot hole 72. As previously discussed, the coupled anchors 16, 18 resist relative rotational movement or disconnection when a clockwise rotational force is applied to the second anchor 18 due to the angular geometry of the ramps 32, 42. As such, the anchors 16, 18 remain coupled while the user turns the handle 52 clockwise to insert and secure the anchors 16, 18 into the respective pilot holes 72, 74, as depicted in FIG. 19.

Figure 20:
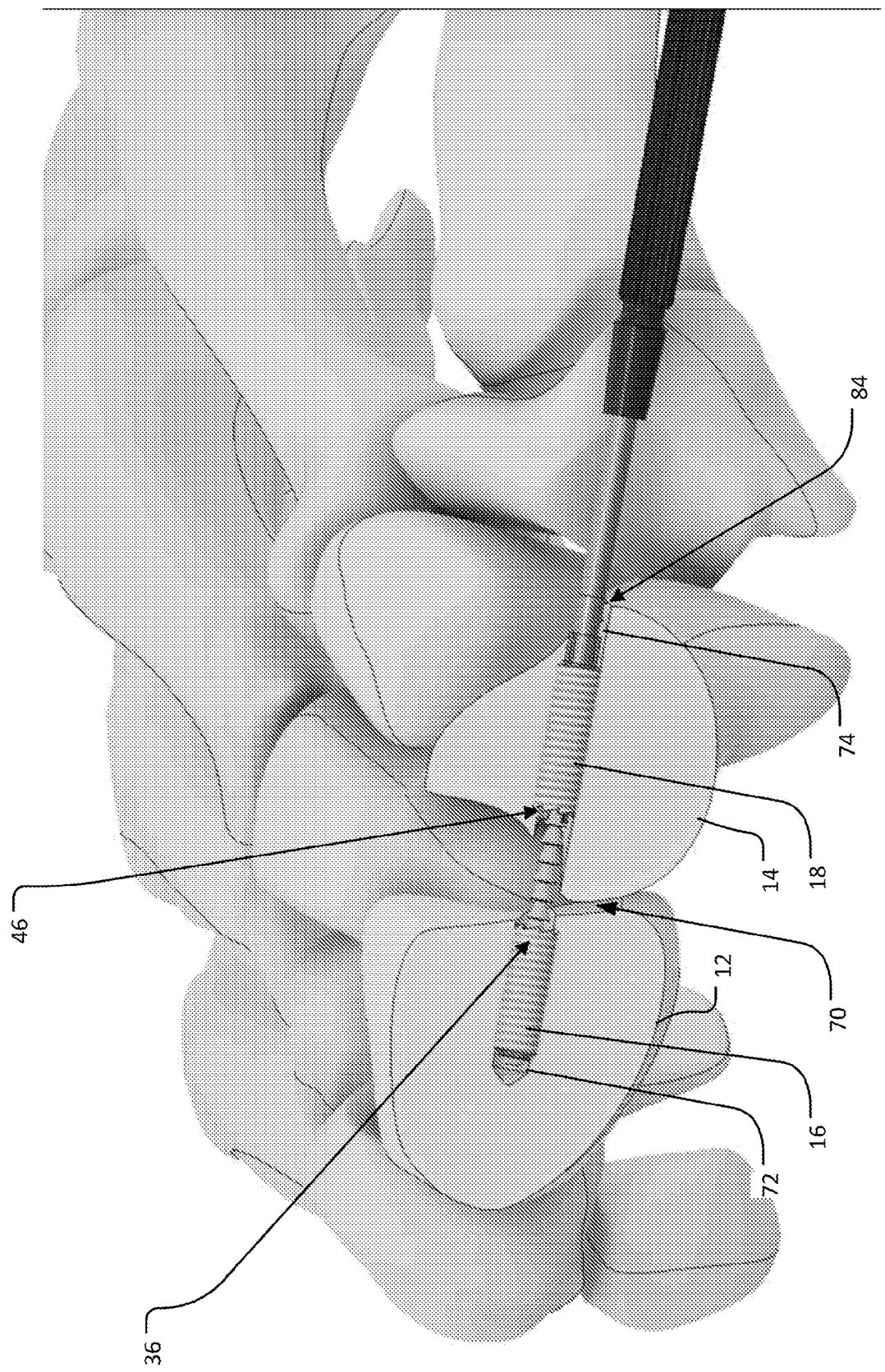

Referring to FIG. 20, once the first anchor 16 is positioned in the pilot hole 72 in the lunate 12, the user can use the handle 52 to rotate the driver 50 in a counterclockwise direction to decouple the second anchor 18 from the first anchor 16. As previously discussed, due to the angular geometry of the ramps 36, 46 the ramps 36, 46 separate and the anchors 16, 18 decouple in response to counterclockwise rotational forces applied to the second anchor 18. As a result, when the user rotates the driver 50 coupled to the second anchor 18 in a counterclockwise direction, the second anchor 18 decouples from the first anchor 16, leaving the first anchor positioned in the lunate pilot hole 72. As depicted in FIG. 20, the user can continue to rotate the driver 50 in a counterclockwise direction to position and secure the second anchor 18 in the scaphoid pilot hole 74. For example, as depicted in FIG. 20, the user continues to rotate the driver 50 in a counterclockwise direction until the entire second anchor 18 is positioned within and secured to the scaphoid pilot hole 74. The threads 13 along the external surface of the second anchor 18 help to secure the second anchor 18 in the pilot hole 74.

Still referring to FIG. 20, when rotating the driver 50 counterclockwise to position the second anchor 18 in the scaphoid pilot hole 74, the first anchor 16 maintains its position within the lunate pilot hole 72 and the end of the tether 20 remains attached to the first anchor 16. As a result, a portion of the tether 20 is exposed between the first anchor 16 and the second anchor 18 and spans the interosseous space 70 between lunate 12 and scaphoid 14, as depicted in FIG. 20.

Figure 21:
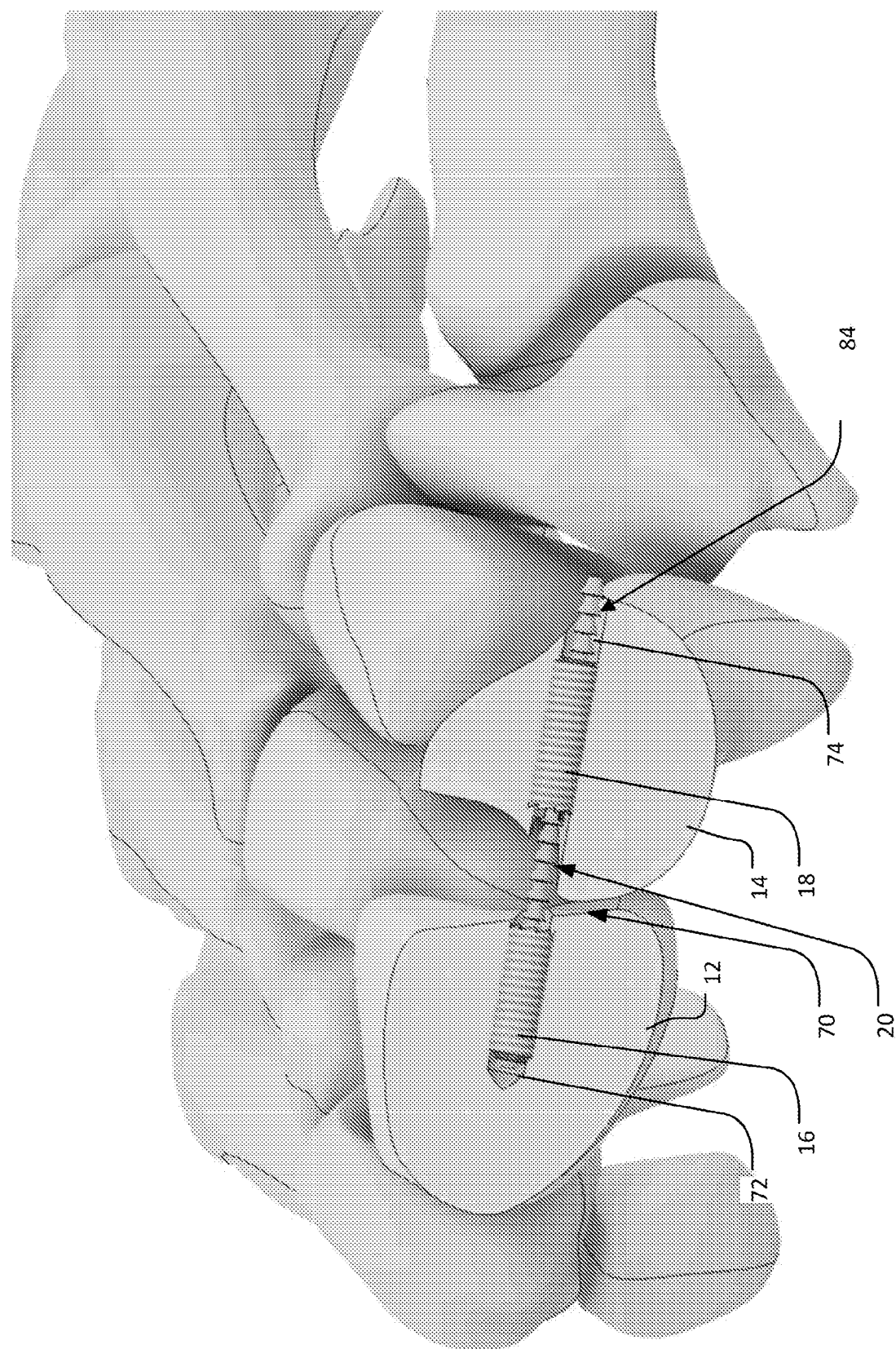

Referring to FIG. 21, once the second anchor 18 is positioned within the scaphoid pilot hole 74, the driver 50 can be pulled away from the second anchor 18 towards the external opening 84 of the scaphoid pilot hole 74 to decouple the driver 50 from the driver interface 45 of the second anchor 18 and remove the driver 50 from the scaphoid pilot hole 74. As depicted in FIG. 21, the second anchor 18 remains positioned in the scaphoid pilot hole 74 upon disconnection and removal of the driver 50.

Figure 22:
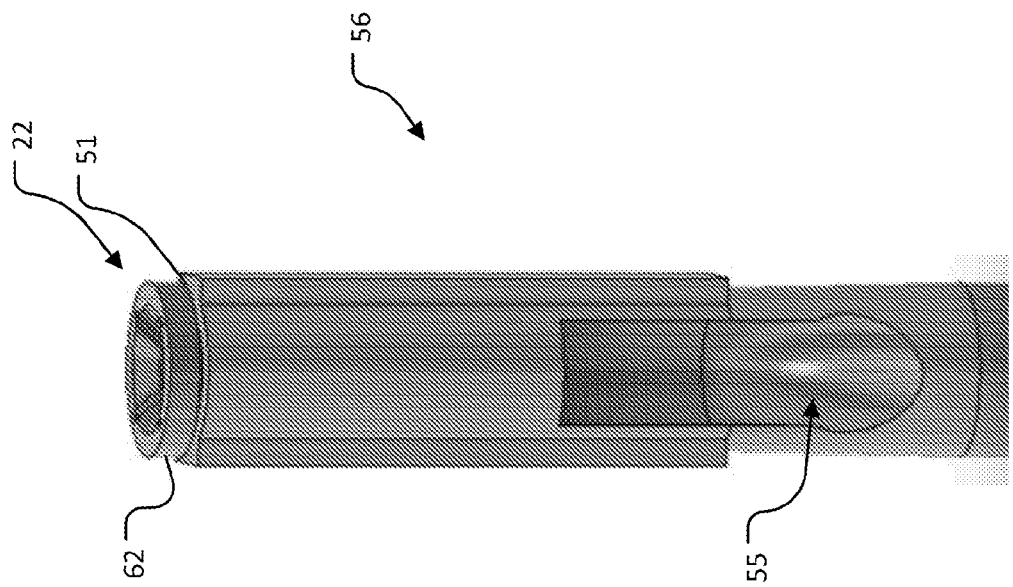

Once first anchor 16 and the second anchor 18 are positioned in the lunate pilot hole 72 and the scaphoid pilot hole 74, respectively, a pawl 22 can be attached to the tether 20 to secure the position of the tether 20 within the second anchor 18 and enable the tension along the tether 20 to be adjusted. The driver 50 can be used to position the pawl 22 over the tether 20. For example, as previously discussed, and as depicted in FIG. 22, the driver tip 56 is configured to couple to the pawl 22 with the leaflets 64 of the pawl 22 being positioned inside the lumen 57 of the driver tip 56, and the base 62 of the pawl abutting the top surface 51 of the driver tip 56. The driver tip 56 is sized to support and cover the entire circumference of the base 62 of the pawl 22, which ensures that the pawl 22 does not shift or dislodge from the driver 50 when the pawl 22 is being pushed over the tether 20.

Figure 23:
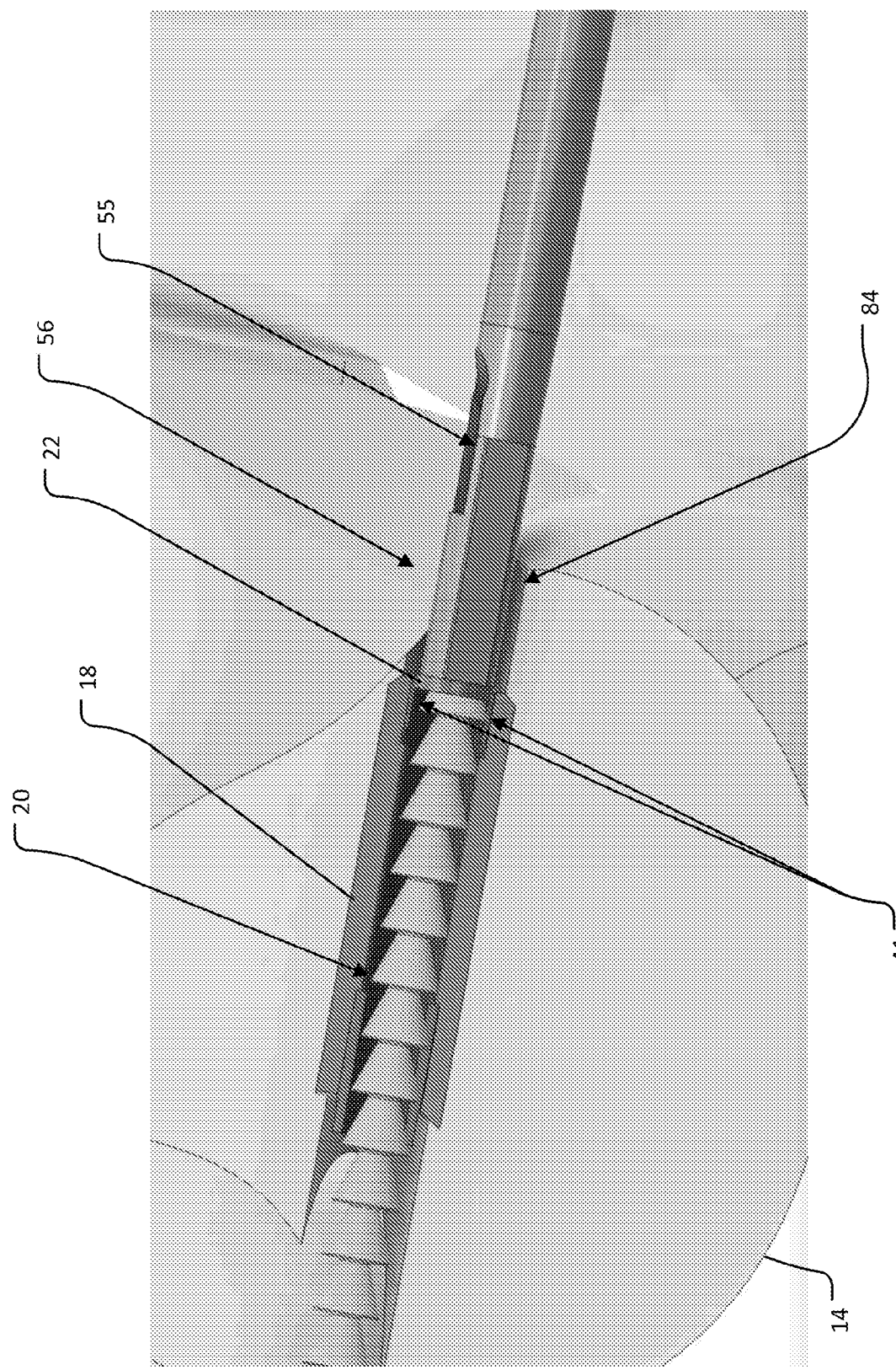

Referring to FIG. 23, once the pawl 22 is positioned on the driver tip 56, the user can use the handle 52 of the driver 50 to align the driver tip 56 with the external opening 84 of the scaphoid pilot hole 74 and insert the pawl 22 over the tether 20 and into the second anchor 18. The user uses a first hand to push the driver 50 through the scaphoid pilot hole 74 in order to push the pawl 22 over the tether 20, while the user or an assistant simultaneously uses a second hand to apply tension along the tether 20 to keep the tether 20 taut as the pawl 22 is pushed over the tether 20. As previously discussed, in some implementations, the leaflets 64 of the pawl 22 are configured to deform or to flex along the connection of the leaflets 64 to the base 62 without breaking or dislodging from the base 62 in order to accommodate a tether 20 inserted through the central opening 66 of the pawl 22. Further, in some implementations, the conical elements 24 of the tether are configured to deform slightly as the elements 24 are inserted through the pawl 22.

The user can continue to push the driver into the scaphoid pilot hole 74 until the base 62 of the pawl 22 is positioned to abut the surface of the inner lip 41 of the second anchor 18, as depicted in FIG. 23. As previously discussed, the inner lip 41 of the second anchor 18 prevents movement of the pawl 22 towards the interosseous space 70.

As the driver tip 56 is pushed into the second anchor 18 and the end of the tether 20 passes through the lumen 57 of the driver tip 56, the user can use his second hand to pull the tether 20 through the opening 55 in the driver tip 56. Once the pawl 22 is positioned against the inner lip 41 of the second anchor 18, the user can pull on the exposed end of the tether 20 through the opening 55 in the driver tip 56 to increase the tension along the tether 20, and thus apply increased tension across interosseous space 70 between the anchors 16, 18. The increased tension draws the second anchor 18 towards the first anchor 16, reducing the space 70 between the scaphoid 14 and lunate 12 bones.

In addition, the user can rotate the driver 50 counterclockwise to engage the driver 50 with the driver interface 45 proximate the bottom 46 of the second anchor 18 and cause the second anchor to move outwards towards the external opening 84 of the scaphoid pilot hole 74 (i.e., away from the interosseous space 70) in order to increase the tension along the tether 20, and thus apply increased tension across the interosseous space 70 between the anchors 16, 18. Conversely, the user can rotate the driver 50 clockwise to cause the second anchor 18 to move inwards towards the interosseous space 70 in order to decrease the tension along the tether 20, and thus reduce the tension across the interosseous space 70 between the anchors 16, 18.

Figure 24:
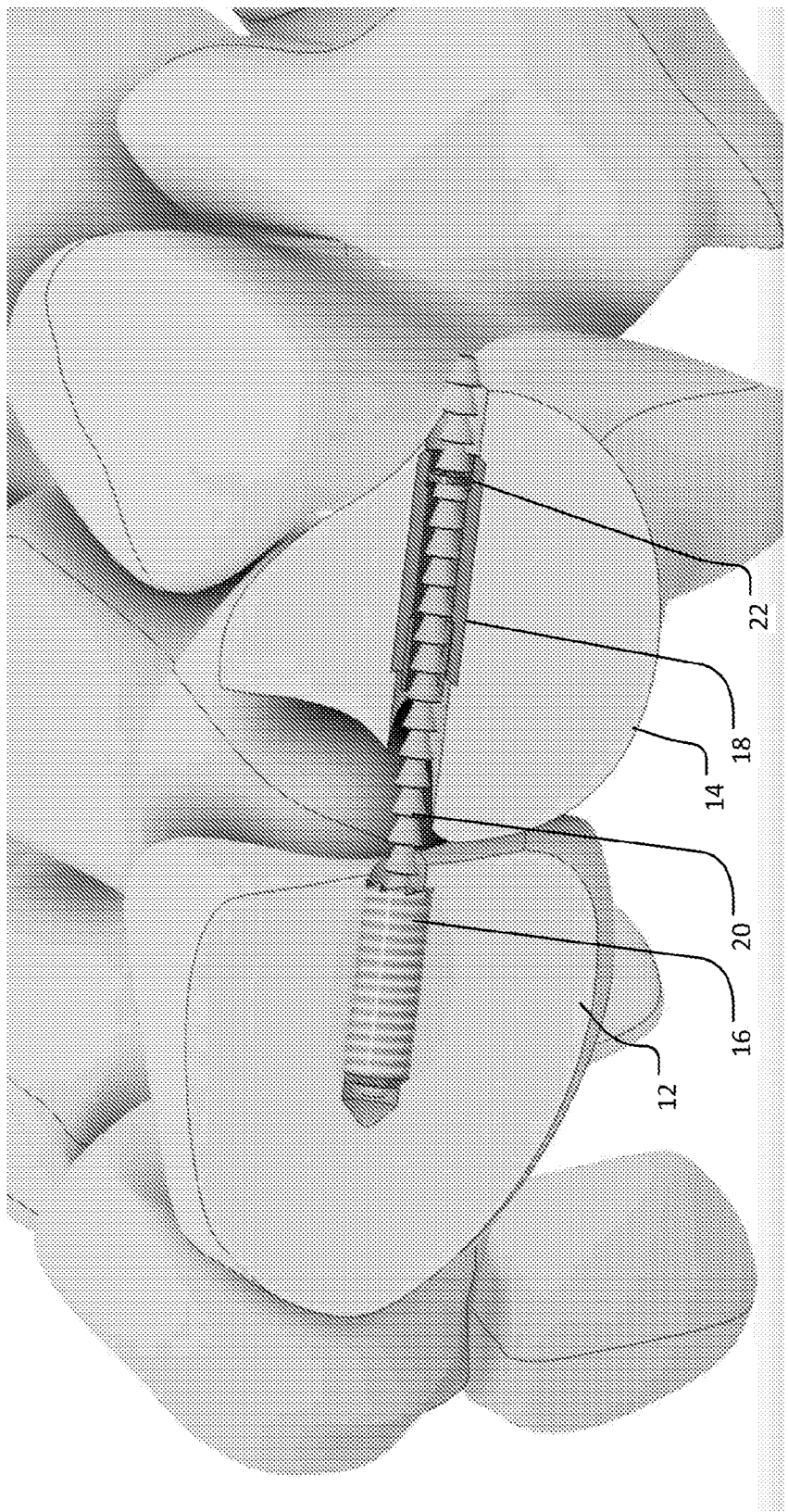

Referring to FIG. 24, once the pawl 22 is coupled to the tether 20 and positioned within the second anchor 18, and once the desired tension along the tether 20 has been achieved, the driver 50 is pulled away from the second anchor 18 towards the external opening 84 of the scaphoid pilot hole 74 to decouple the driver 50 from the pawl 22 and remove the driver 50 from the scaphoid pilot hole 74. As depicted in FIG. 24, the pawl 22 remains positioned in the second anchor 18 upon disconnection and removal of the driver 50.

Figure 25:
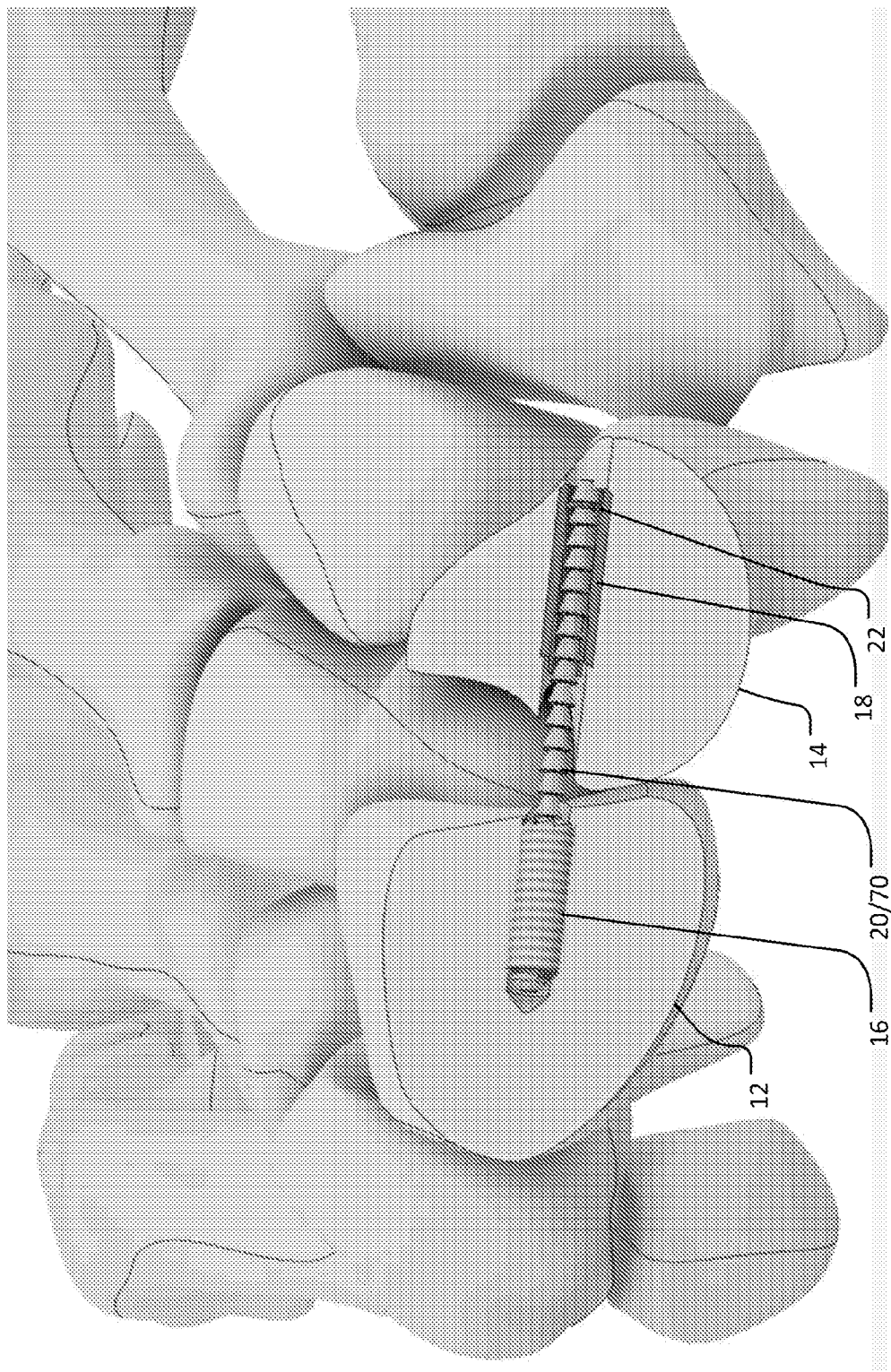

As depicted in FIG. 24, in some implementations, the tether 20 extends outside the second anchor 18 following placement of the pawl 22 over the tether 20 and adjustment of the tension along the tether 20, and the excess length of tether 20 extending beyond the second anchor 18 is trimmed. For example, a cutter tool can be inserted into the scaphoid pilot hole 74 to trim the length of tether 20 that extends outside of the second anchor 18 such that the end of the tether 20 is inside the second anchor 18, as depicted in FIG. 25. In some implementations, the driver 50 includes a cutter tool, and cutter tool of the driver 50 is used to trim the length of tether 20 that extends outside of the second anchor 18. In some implementations, a separate cutting tool is used to trim the length of tether 20 that extends outside the second anchor 18. In some implementations, following insertion of the pawl 22, a cutting accessory can be placed onto or otherwise attached to the driver 50 and can be used to trim the length of tether 20 that extends outside of the second anchor 18. In some implementations, the length of tether 20 that extends outside of the second anchor 18 is trimmed such that there is at least one complete element 24 extending beyond the pawl 22 towards the bottom 46 of the second anchor 18.

Another method of repairing a scapholunate ligament rupture using the interosseous coupler 10 will now be described with reference to FIGS. 26-30.

Figure 26:
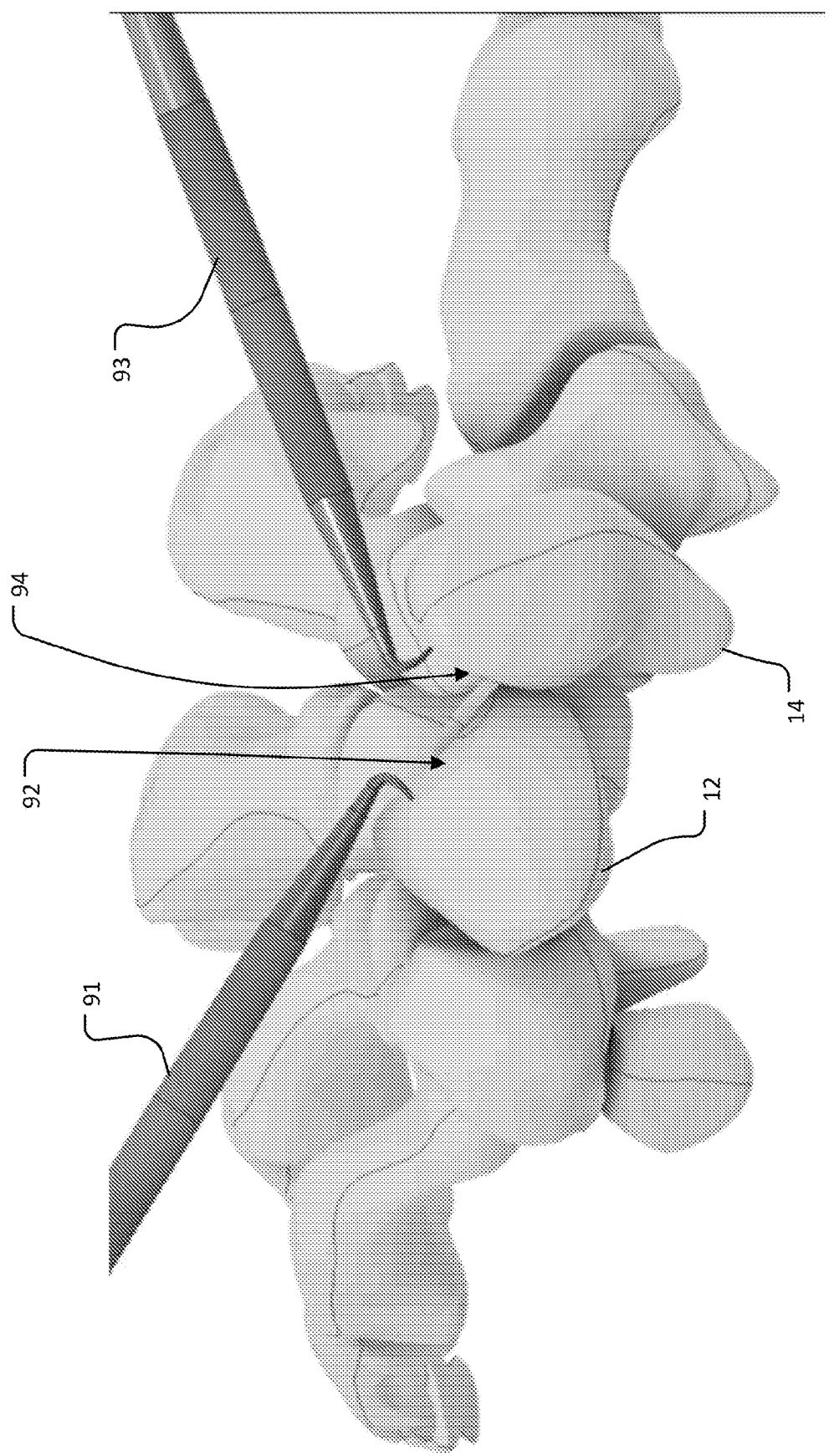
FIGS. 26-30 depict another exemplary method of implanting an interosseous coupler.

Referring to FIG. 26, in order to prepare the lunate 12 and scaphoid 14 for implantation of the interosseous coupler 10, the lunate 12 and scaphoid 14 are manipulated to exposed the articular surface 92 of the lunate 12 and the articular surface 94 of the scaphoid 14. For example, as depicted in FIG. 26, skin hooks 91, 93 can be used to move the lunate 12 and scaphoid 14 in order to expose the articular surface 92 of the lunate 12 and the articular surface 94 of the scaphoid 14.

Figure 27:
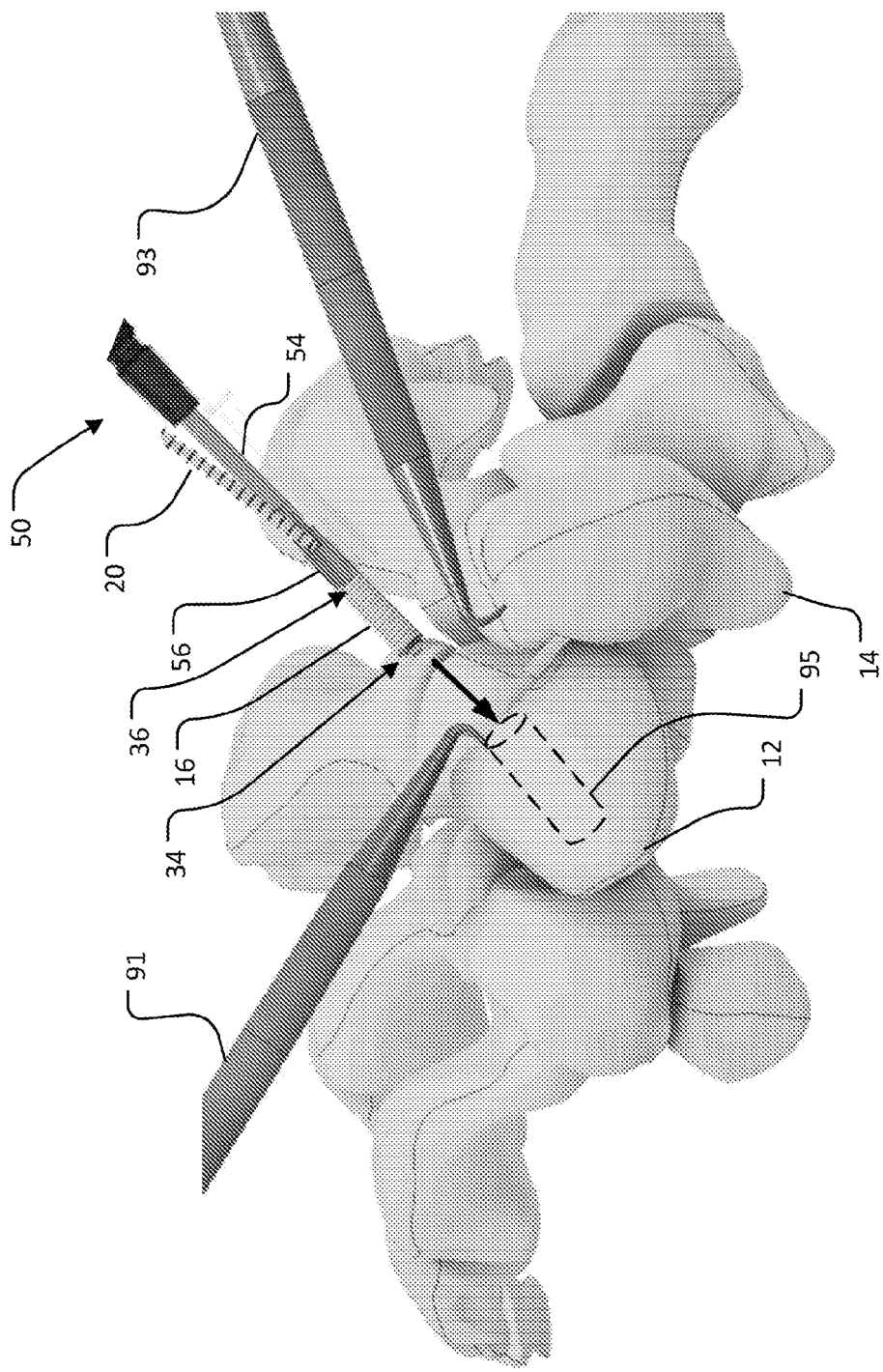

Once the articular surface 92 of the lunate 12 and the articular surface 94 of the scaphoid 14 are exposed, a drill tool (not shown) is inserted into the lunate 12 from the articular surface 92 of the lunate 12 in order to create a pilot hole 95 (as depicted in FIG. 27) in the lunate 12. In some implementations, the lunate pilot hole 95 is drilled into the lunate 12 slightly distal to the midpoint of the lunate 12 and terminates proximate the proximal ulnar corner of the lunate 12.

Figure 28:
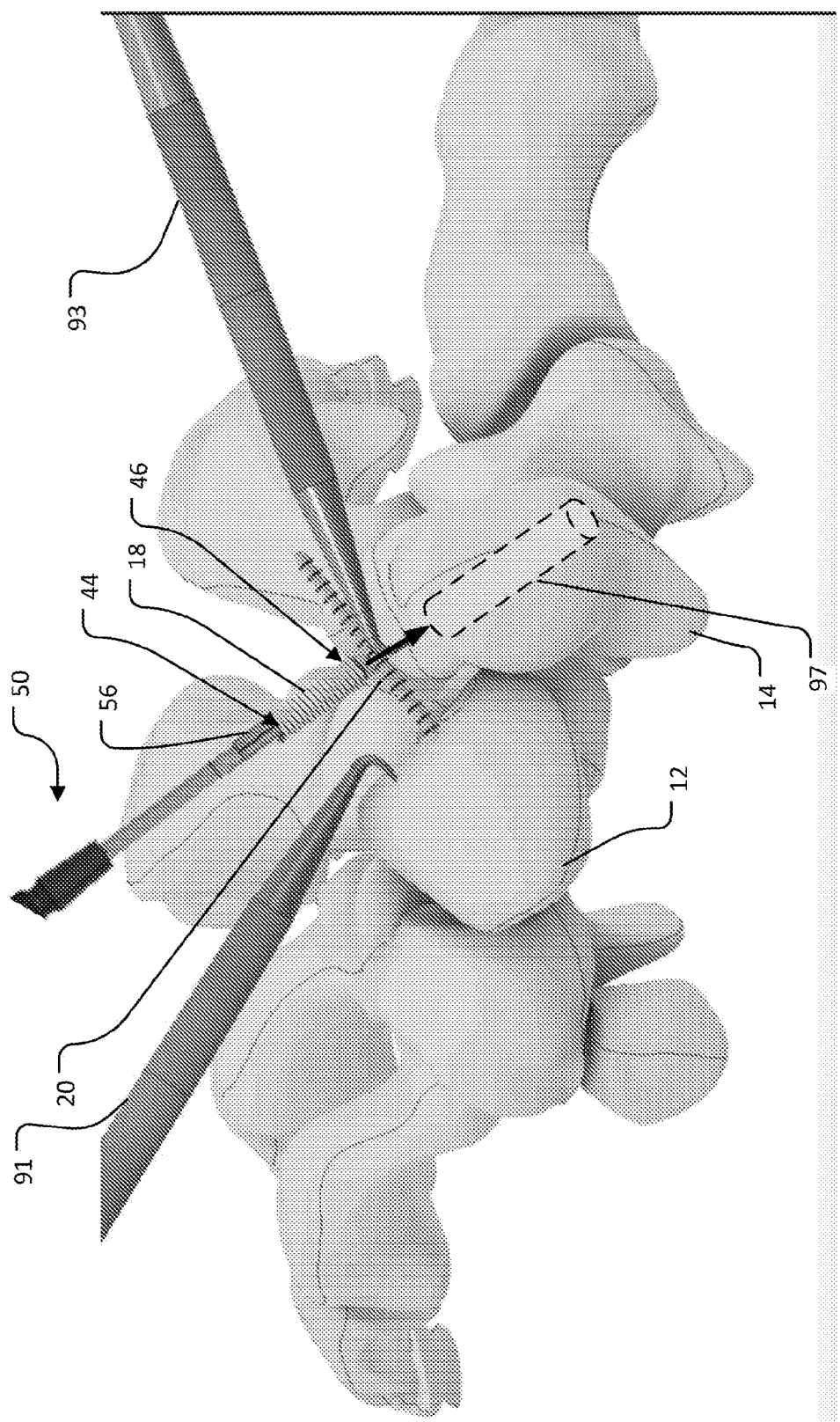

The drill tool is also used to drill a pilot hole in the scaphoid 14. For example, the drill tool can be inserted into the scaphoid 14 from the articular surface 94 of the scaphoid 14 in order to create a pilot hole 97 (as depicted in FIG. 28) in the scaphoid 14. In some implementations, the scaphoid pilot hole 97 is drilled into the scaphoid proximate the midpoint of the articular surface 94 of the scaphoid completely through scaphoid 14 proximate the ridge between the articular cartilage and the nonarticular cartilage of the scaphoid 14.

Referring to FIG. 27, once the pilot holes 95, 97 have been drilled into the lunate 12 and the scaphoid 14, and while maintaining the position of the lunate 12 and the scaphoid 14 using the skin hooks 91, 93, the driver 50 is used to insert the first anchor 16 and the tether 20 into the pilot hole 95 in the lunate 12. For example, if the tether 20 is not already attached to the top 44 of the first anchor 16, the user can insert the tether 20 through the lumen 39 of the first anchor 16 and attach the end of the tether 20 to the top 44 of the first anchor 16. Once the tether 20 is inserted through and attached to the first anchor 16, the driver tip 56 can be coupled to the driver interface 35 on the bottom 36 of the first anchor 16. As depicted in FIG. 27, the excess length of tether 20 extending from the bottom 36 of the first anchor 16 can be inserted into the lumen 57 of the driver tip 56 and pulled through the opening in the driver tip 55 during implantation of the first anchor 16 in the lunate 12. In some embodiments, the shaft 54 of the driver 50 includes a lumen that extends along the length of the shaft 54 and is fluidly coupled to the lumen 57 of the driver tip 56, and the length of tether 20 extending beyond the bottom 36 of the first anchor 16 can be inserted into the lumen of the driver shaft 54 during implantation of the first anchor 16 in the lunate 12.

Once the first anchor 16 is coupled to the driver tip 56, the driver 50 can be inserted into the pilot hole 95 in the lunate 12 from the articular surface 92 of the lumen 12. For example, the user can align the first anchor 16 with the opening of the pilot hole 95 on the articular surface 92 of the lunate 12, and once the first anchor 16 is aligned with the lunate pilot hole 95, the user can turn the driver 50 in a clockwise direction to position and secure the first anchor 16 in the pilot hole 95 in the lunate 12. The user continues to rotate the driver 50 in a clockwise direction until the entire first anchor 16 is positioned within and secured to the pilot hole 95 in the lunate 12. The threads 11 along the external surface of the first anchor 16 help to secure the first anchor 16 in the pilot hole 95.

Once the first anchor 16 has been properly positioned in the lunate pilot hole 95, the driver 50 can be pulled away from the first anchor 16 towards the articular surface 92 of the lunate 12 in order to decouple the driver 50 from the driver interface 35 of the first anchor 18 and remove the driver 50 from the lunate pilot hole 92. As depicted in FIG. 28, the first anchor 16 maintains its position within the lunate pilot hole 95. As depicted in FIG. 28, once the first anchor 16 is properly placed in the lunate pilot hole 92, the end of the tether 20 opposite the first anchor 16 projects outside the lunate pilot hole 92.

Referring to FIG. 28, once the first anchor 16 has been positioned within the lunate pilot hole 92, the driver 50 is used to insert the second anchor 18 into the pilot hole 97 in the scaphoid 14. To prepare the second anchor 18 for implantation, the second anchor 18 is coupled to the driver 50. For example, a driver interface (e.g., driver interface 43 of FIG. 7) proximate the top 44 of the second anchor 18 is attached to the tip 56 of the driver 50.

Once the second anchor 18 is coupled to the driver 50, the second anchor 18 can be inserted into the pilot hole 97 in the scaphoid 14 from the articular surface 94 of the scaphoid 14. For example, the user can align the second anchor 18 with the opening of the pilot hole 97 on the articular surface 94 of the scaphoid 14, and once the second anchor 18 is aligned with the scaphoid pilot hole 97, the user can turn the driver 50 in a clockwise direction to position and secure the second anchor 18 in the pilot hole 97 in the scaphoid 14. The user continues to rotate the driver 50 in a clockwise direction until the entire second anchor 18 is positioned within and secured to the pilot hole 97 in the scaphoid 14. The threads 13 along the external surface of the second anchor 18 help to secure the second anchor 18 in the pilot hole 97.

Once the second anchor 18 has been properly positioned in the scaphoid pilot hole 97, the driver 50 can be pulled away from the second anchor 18 towards the articular surface 94 of the scaphoid 14 in order to decouple the driver 50 from the driver interface 45 of the second anchor 18 and remove the driver 50 from the scaphoid pilot hole 97. The second anchor 18 maintains its position within the scaphoid pilot hole 97 upon disconnection and removal of the driver 50.

Figure 29:
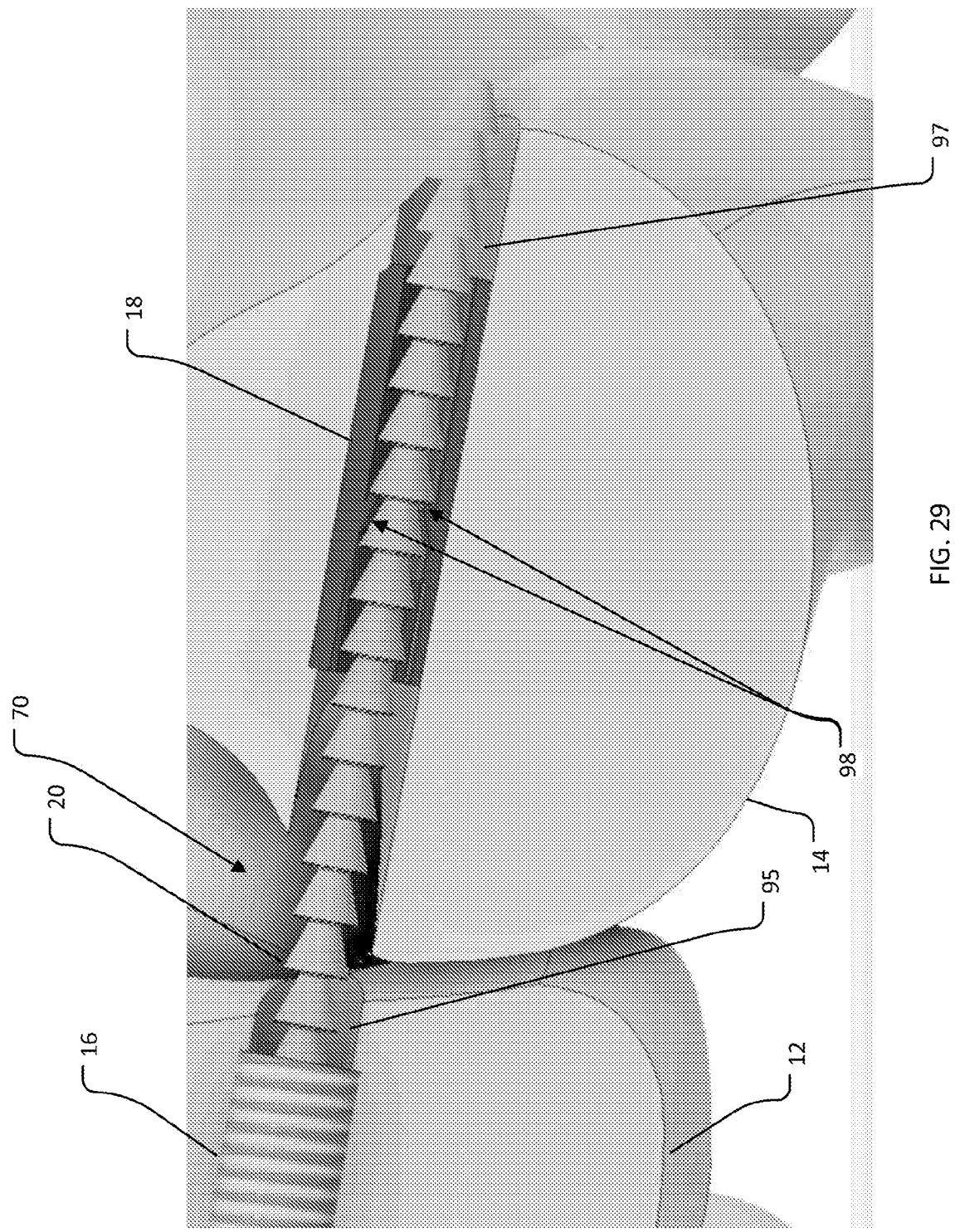

Once the first anchor 16 and the second anchor 18 have been implanted in the respective pilot holes 95, 97, the user can use his fingers to insert the end of the tether 20 opposite the first anchor 16 through the lumen 49 of the second anchor 18, as depicted in FIG. 29. The user can then access the tether through the scaphoid guide pilot hole 97, and can pull the end of the tether 20 through the end of the second anchor 18 to apply tension along the tether 20. By pulling on the end of the tether 20 through the second anchor 18, the length of the tether 20 between the first anchor 16 and the second anchor 18 is reduced, which results in increased tension along the tether in the interosseous space 70 between the anchors 16, 18.

Referring to FIG. 29, in some embodiments, the second anchor 18 include leaflets 98 inside the lumen 49 of the second anchor 18 to capture and maintain the position of the tether 20 within the second anchor 18. In some implementations, a pawl (e.g., pawl 22 of FIGS. 1-25) can be inserted into the second anchor 18 using the driver 50, as described above, and the pawl 22 can alternatively or additionally be used to maintain the position of the tether 20 within the second anchor 18.

Figure 30:
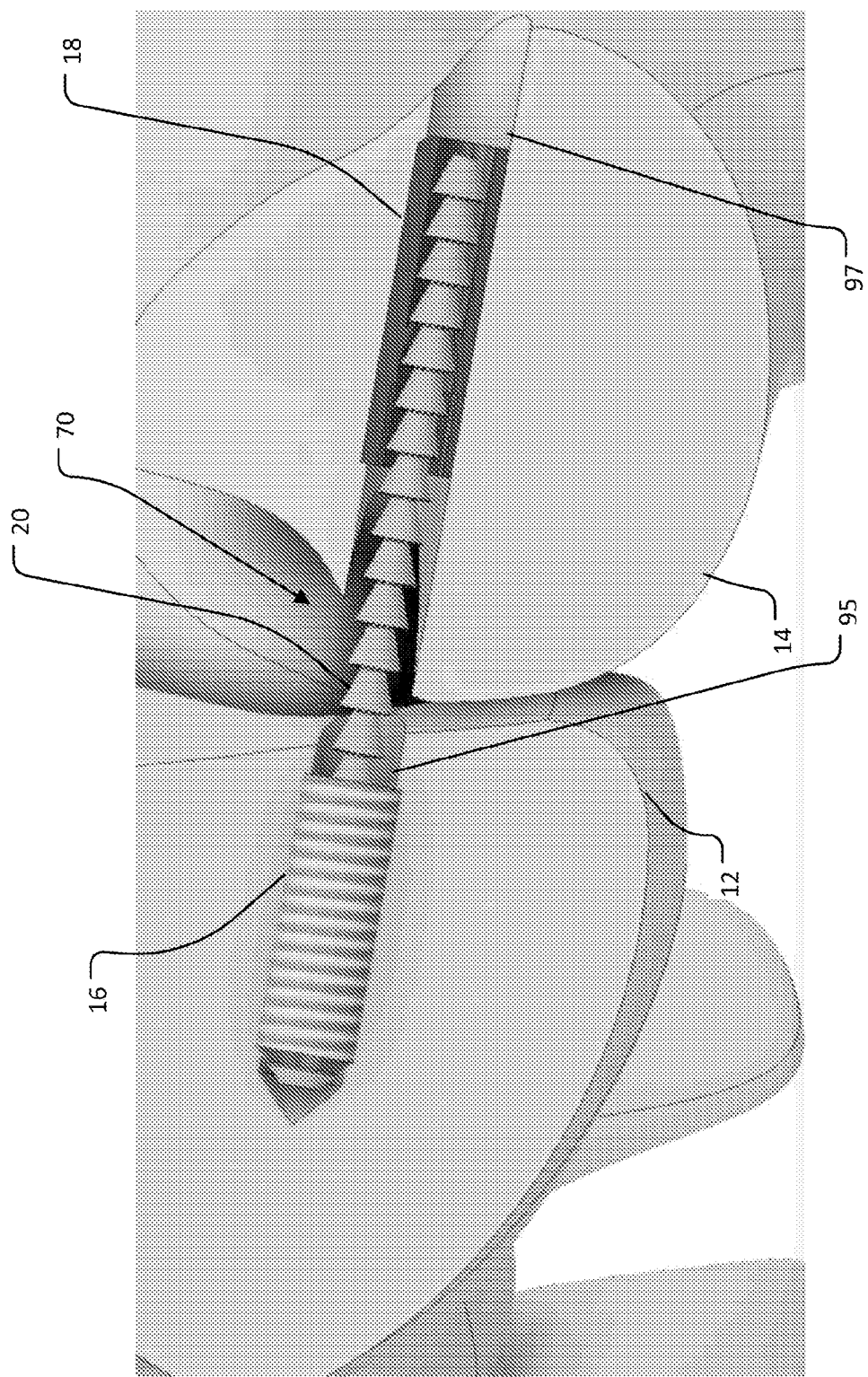

As depicted in FIG. 29, in some implementations, the tether 20 extends outside the second anchor 18 following adjustment of the tension along the tether 20. In some implementations, the excess length of tether 20 extending beyond the second anchor 18 is trimmed. For example, a cutter tool can be inserted into the scaphoid pilot hole 74 to trim the length of tether 20 that extends outside of the second anchor 18 such that the end of the tether 20 is inside the second anchor 18, as depicted in FIG. 30. In some implementations, the driver 50 includes a cutter tool, and the cutter tool of the driver 50 is used to trim the length of tether 20 that extends outside the second anchor 18.

While certain embodiments have been described above, other embodiments are possible.

For example, while the pawl 22 has been depicted as being a separate from the second anchor 18 and being inserted into the second anchor 18 using a driver 50, alternatively or additionally a pawl may be incorporated into the body of the second anchor with leaflets extending into the lumen of the second anchor.

While the pawl 22 is depicted as including four leaflets 64, the pawl 22 may have other numbers of leaflets 64. In addition, in some implementations, the pawl 22 does not include leaflets, and as the tether 20 passes through the pawl 22, the tether 20 elastically deforms, and is coupled to the pawl 22 as a result of the increased diameter of the wide end of the elements 24 of the tether 20. In some implementations, the interosseous coupler 10 does not include a pawl 22.

While the pawl 22 has been depicted as having a base 62 that forms a complete circle, in some implementations, as depicted in FIGS. 31 and 32, the base 82 of the pawl 80 is semicircular with a gap 81 through the base 82. By including a gap 81 in the base 82 of the pawl 80, the pawl 80 can be side loaded onto the tether 20 during installation of the pawl 80 into the second anchor 18. For example, the pawl 80 can be attached to the driver 50, as described above. Once the pawl 80 is attached to the driver 50, the element 24 of the tether 20 extending outside the second anchor 18 and positioned closest to the bottom 46 the second anchor 18 is pushed through the gap 81 in the base 82 of the pawl 80 and into the central opening 66 of the pawl 80. Once the tether 20 is positioned in the central opening 66 of the pawl 80, the driver 50 can be used to push the pawl 80 over the tether 20 through the second anchor 18 and into its final position against the inner lip 41 of the second anchor 18. By side loading a portion of the tether 20 into the pawl 80 close to the bottom 46 of the second anchor 18 via gap 81, rather than loading the tether 20 into the pawl from the end of the tether 20 extending outside the second anchor 18, the total amount of ratcheting along the tether 20 that must be performed to position the pawl 80 in the second anchor 18 can be reduced, which can make the pawl 80 easier to load onto the tether 20.

While the first anchor 16 and the second anchor 18 have been described as including ramps 35, 45, in some implementations the first and second anchor do not have ramps and can be coupled using an alternate coupling mechanism. In addition, in some implementations, the first anchor 16 and the second anchor 18 can include one or more lips, or any other suitable geometric conformity, to assist in temporary coupling of the first anchor 16 and second anchor 18.

While the elements 24 of the tether 20 have been described as having a conical shape, other shapes may be used for the elements 24 of the tether 20. For example, any suitable shape of regularly spaced elements with tapering widths that provide the above-described ratcheting effect may be used to form the tether 20. In some implementations, the elements used to form the tether are rotationally symmetric.

While the driver tip 56 is described as having a particular cross-sectional shape (e.g., as depicted in FIG. 13), the driver tip may be configured to have other cross-sectional shapes including, but not limited to, a star shape, a hexagon, a rectangle, etc.

While the driver tip 56 has been depicted as being aligned with the longitudinal axis of the driver shaft 54, in some embodiments, the driver tip 56 can be offset from the longitudinal axis of the driver shaft 54.

While the tether 20 has been described as being attached to the first anchor 16 prior to implantation of the first anchor 16, in some embodiments, the tether 20 can be inserted into and attached to the first anchor 16 after implantation of the first anchor 16 into the lunate 12.

In some implementations, the tether 20 includes a string or pull attached to an end of the tether 20 to facilitate threading the tether 20 through the second anchor 18, the pawl 22, and/or the lumen 57 of the driver tip 56. For example, the tether 20 can include a string attached to an end of the tether 20 opposite the end of the tether 20 attached to the first anchor 16.

Figure 33:
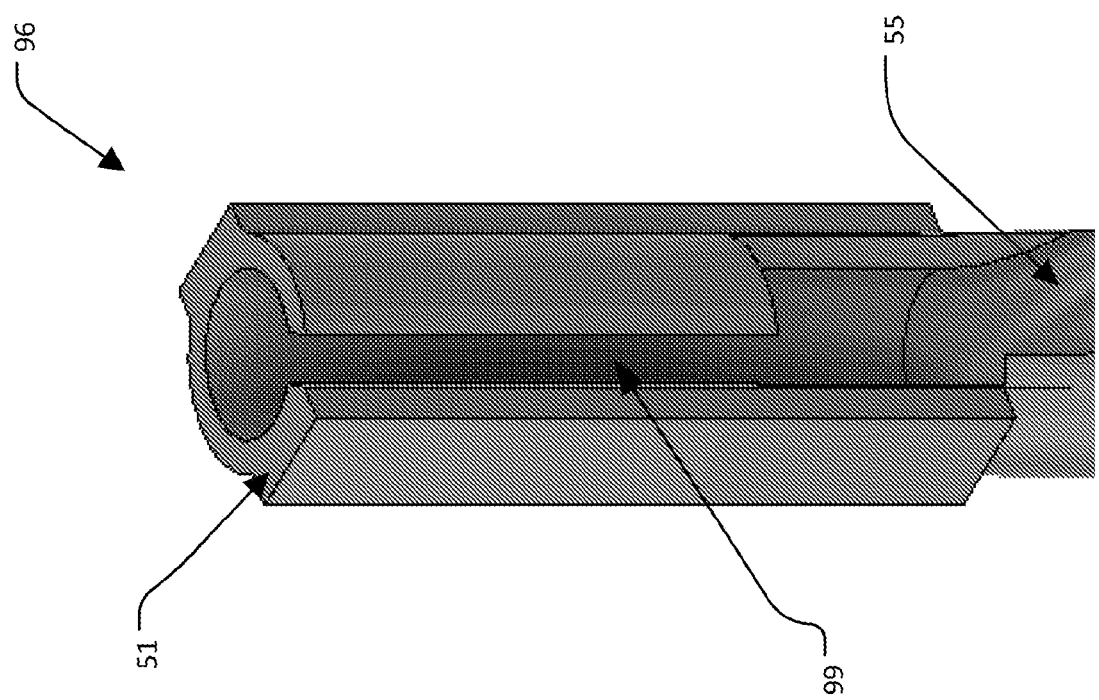
FIG. 33 depicts an alternate tip for the driver of FIG. 12.

Further, as depicted in FIG. 33, in some implementations, the driver tip 96 includes a slit 99 that extends from the top surface 51 of the driver tip 99 to the opening 55 in the driver tip 96. The slit 99 in the driver tip 96 can be used to facilitate insertion of the tether 20 (or insertion of a string attached to the end of the tether 20) into the lumen 57 of the driver tip 96 during implantation of the anchors 16, 18 and during insertion of the pawl 22 into the second anchor 18.

Figure 34:
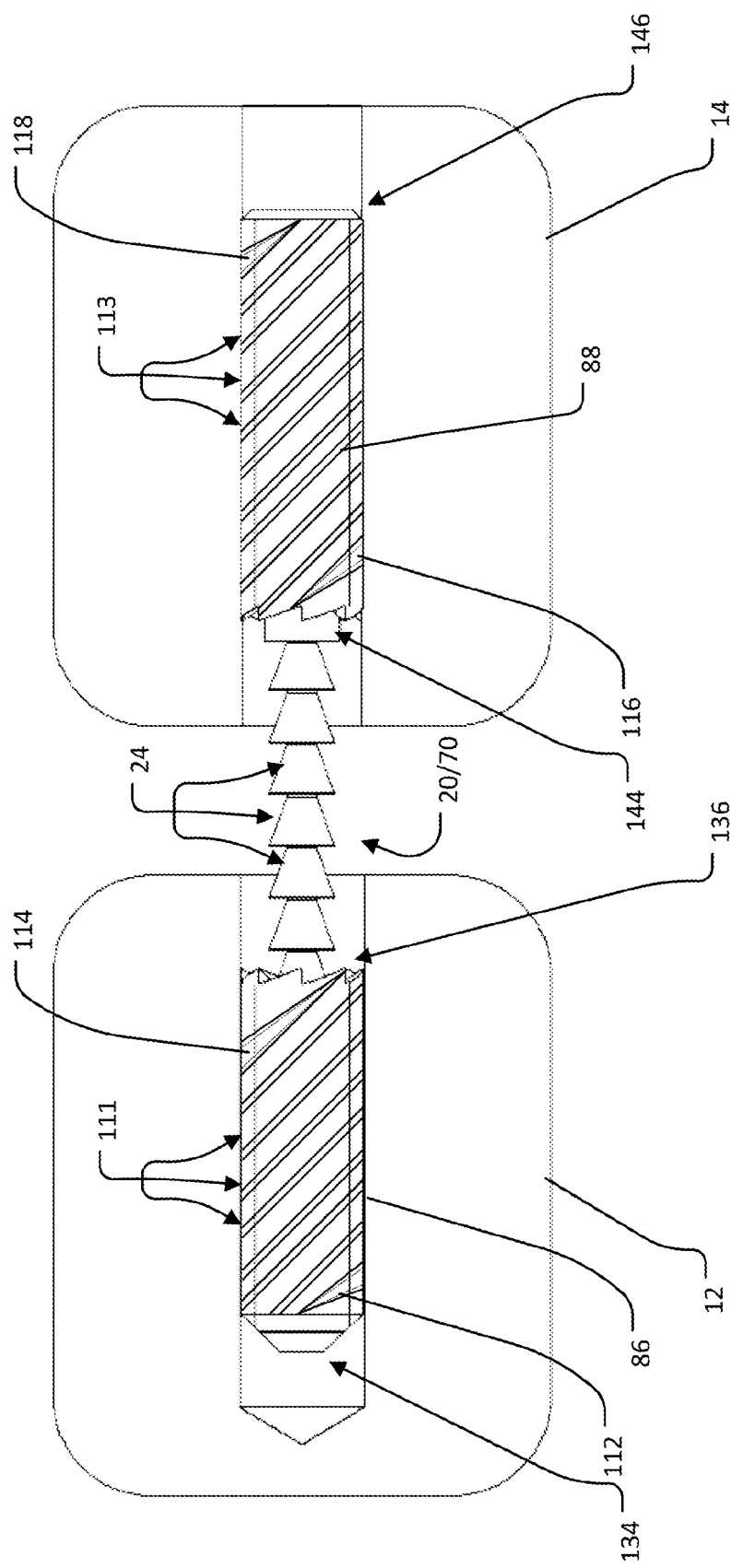
FIG. 34 depicts alternate anchors for the interosseous coupler 10 of FIG. 1.

In some implementations, prior to implanting the anchors 16, 18, a tap can be used to generate threads in the bones 12, 14, and the threads in the bones 12, 14 generated by the tap can engage the threads on the anchors 16, 18 during implantation of the anchors 16, 18 to secure the position of the anchors 16, 18. In some implementations, the anchors 16, 18 are self-tapping and, as a result, create female threads in the bones 12, 14 during implantation of the anchors 16, 18 into the bones 12, 14. For example, as depicted in FIG. 34, the first anchor 86 can include threads 111 with cutting edges 112, 114 proximate both the top 134 and bottom 136 of the first anchor 86. Similarly, the second anchor 88 can include threads 113 with cutting edges 116, 118 proximate both the top 144 and bottom 146 of the second anchor 88. By including threads 111, 113 with a cutting edge 112, 114, 116, 118 proximate both sides 134, 136, 144, 146 of each of the anchors 86, 88, both the first anchor 86 and the second anchor 88 are self-tapping when driven in either the forward direction or backwards direction through the bones 12, 14.

While the interosseous coupler 10 has been described as being implanted across the lunate 12 and scaphoid 14 to repair a scapholunate ligament rupture, the interosseous coupler 10 can be implanted into other bones in order to repair other musculoskeletal injuries, including, but not limited to, scapholunate wrist injuries, basal joint thumb arthritis and injuries, interosseous membrane forearm injuries, acromioclavicular joint injuries, ankle syndesmosis injuries, foot Lisfranc injuries, proximal tibiofibular joint injuries, to perform spine correction, and to bring metacarpals together in ray amputations.

In addition, in some implementations, the size of the interosseous coupler 10 corresponds to the size of the anatomy in which the coupler 10 is being implanted. For example, larger anchors 16, 18, tether 20, and pawl 22 can be used in larger bones, whereas smaller anchors 16, 18, tether 20, and pawl 22 can be used in smaller bones.

A number of embodiments have been described. Nevertheless, it will be understood that various modifications may be made without departing from the spirit and scope of the disclosure. Accordingly, other embodiments are within the scope of the following claims.

What is claimed is:

1. A system comprising:
   an interosseous coupler comprising:
   a first anchor configured to be implanted within a first bone, the first anchor comprising a first projection extending from a circumferential surface of the first anchor;
   a second anchor spaced longitudinally apart from the first anchor and configured to be implanted within a second bone, the second anchor comprising a second projection extending from a circumferential surface of the second anchor, the first projection configured to contact the second projection to releasably couple the first anchor to the second anchor; and
   a tether extending between the first anchor and the second anchor, the tether comprising a plurality of attached elements; and
   a driver configured to couple to the first anchor and the second anchor and apply rotational force to the first anchor and the second anchor,
   wherein each element of the plurality of attached elements has a tapering width.

2. The system of claim 1, further comprising a pawl configured to be positioned over the tether and maintain a position of the tether within at least one of the first anchor and the second anchor.

3. The system of claim 2, wherein the driver is configured to releasably couple to the pawl and position the pawl over the tether.

4. The system of claim 2, wherein the pawl comprises:
   a base; and
   a plurality of leaflets coupled to the base, the leaflets defining a central opening through the pawl.

5. The system of claim 2, wherein:
   the pawl is configured to enable insertion of the tether through the pawl in a first direction; and
   the pawl resists movement of the tether in a second direction, the second direction being opposite the first direction.

6. The system of claim 2, wherein an exterior surface of at least one of the first anchor and the second anchor is threaded.

7. The system of claim 2, wherein the pawl is incorporated into the second anchor.

8. The system of claim 1, wherein the driver comprises:
   a handle;
   a shaft extending from the handle; and
   a tip coupled to the shaft, wherein the tip is configured to couple with a driver interface of at least one of the first anchor and the second anchor.

9. The system of claim 8, wherein a cross-section of the tip along a plane orthogonal to a longitudinal axis of the driver is a non-circular cross section.

10. The system of claim 8, wherein the tip comprises:
    a lumen extending through the tip; and
    an opening positioned on a side of the tip and sized to allow the tether to pass through the opening.

11. The system of claim 1, wherein each of the plurality of attached elements has a conical shape.

12. The system of claim 1, wherein the first and second anchors are positioned along a same longitudinal axis.

13. The system of claim 1, wherein the tether is configured to be moved through the second anchor and past an outer end of the second anchor for adjusting a tension across an interosseous space.

14. The system of claim 1, wherein the tether is movable past an outer end of the second anchor via a ratcheting engagement.

15. The system of claim 1, wherein each attached element of the plurality of attached elements is attached to another attached element of the plurality of attached elements.

16. The system of claim 1, wherein the first projection comprises a first plurality of angled ramps and the second projection comprises a second plurality of angled ramps.

17. The system of claim 1, wherein the driver comprises a cutter tool configured to trim a length of the tether.

18. The system of claim 1, wherein the second anchor comprises a pawl incorporated into a body of the second anchor, the pawl comprising a plurality of leaflets extending from a lumen of the second anchor.

19. A method comprising:
    positioning a first anchor in a first pilot hole in a first bone using a driver, the first anchor comprising a first projection extending from a circumferential surface of the first anchor;
    positioning a second anchor in a second pilot hole in a second bone opposite the first bone using the driver, the second anchor spaced longitudinally apart from the first anchor and the second anchor comprising a second projection extending from a circumferential surface of the second anchor, the first projection configured to contact the second projection to releasably couple the first anchor to the second anchor, the driver configured to couple to the first anchor and the second anchor and apply rotational force to the first anchor and the second anchor;
    positioning a pawl over a tether using the driver, the tether extending through the first anchor and the second anchor and spanning across an interosseous space between the first anchor and the second anchor, the tether comprising a plurality of attached elements and wherein each element of the plurality of attached elements has a tapering width; and
    adjusting tension along the tether.

20. An interosseous coupler comprising:
    a first anchor configured to be implanted within a first bone, the first anchor comprising a first projection extending from a circumferential surface of the first anchor;
    a second anchor spaced longitudinally apart from the first anchor and configured to be implanted within a second bone, the second anchor comprising a second projection extending from a circumferential surface of the second anchor, the first projection configured to contact the second projection to releasably couple the first anchor to the second anchor; and
    a tether extending between the first anchor and the second anchor, the tether comprising a plurality of attached elements, wherein each element of the plurality of attached elements has a tapering width.

* * * * *